United States Patent
Saleh et al.

(10) Patent No.: US 11,222,397 B2
(45) Date of Patent: Jan. 11, 2022

(54) FOVEATED RENDERING IN TILED ARCHITECTURES

(71) Applicant: QUALCOMM Incorporated, San Diego, CA (US)

(72) Inventors: Skyler Jonathon Saleh, San Diego, CA (US); David Rigel Garcia Garcia, North York (CA); Maurice Franklin Ribble, Lancaster, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/390,333

(22) Filed: Dec. 23, 2016

(65) Prior Publication Data

US 2018/0182066 A1 Jun. 28, 2018

(51) Int. Cl.
| | |
|---|---|
| *G06T 3/40* | (2006.01) |
| *G06T 11/40* | (2006.01) |
| *G06T 15/00* | (2011.01) |
| *G06T 15/04* | (2011.01) |
| *G06T 15/20* | (2011.01) |
| *G06T 1/20* | (2006.01) |
| *G06T 3/00* | (2006.01) |
| *G06F 3/01* | (2006.01) |
| *H04N 1/387* | (2006.01) |

(Continued)

(52) U.S. Cl.
CPC ............ *G06T 3/40* (2013.01); *G06T 15/005* (2013.01); *G06T 15/20* (2013.01); *H04N 1/3876* (2013.01); *H04N 1/3935* (2013.01); *G06T 15/80* (2013.01); *G06T 2207/20021* (2013.01); *G06T 2210/36* (2013.01)

(58) Field of Classification Search
CPC ....... G09G 2340/02; G09G 2340/0407; G09G 2340/045; G09G 2340/12; G09G 5/14; G09G 5/34; G09G 5/36; G09G 5/377; G09G 5/38; G09G 5/391; G06F 2203/04806; G06F 3/0485; G06F 17/30994; G06F 17/3028; G06F 3/0481
USPC .......... 345/629; 382/299, 305; 715/815, 838
See application file for complete search history.

(56) References Cited

U.S. PATENT DOCUMENTS 5,682,441 A 10/1997 Ligtenberg et al.
6,366,899 B1 * 4/2002 Kernz .................... G06Q 40/04
(Continued)

FOREIGN PATENT DOCUMENTS

WO 2017015162 A1 1/2017

OTHER PUBLICATIONS

Guenter, B., Finch, M., Drucker, S., Tan, D., Snyder, J. 2012. Foveated 3D Graphics. ACM Trans. Graph. 31(6), Article 164 (Nov. 2012) at https://dl.acm.org/doi/pdf/10.1145/2366145.2366183 (Year: 2012).*

(Continued)

*Primary Examiner* — Jin Cheng Wang
(74) *Attorney, Agent, or Firm* — Campbell C. Chiang; Shumaker & Sieffert, P.A.

(57) ABSTRACT

This disclosure describes examples for foveation rendering. A graphics processing unit (GPU) may render image content for each tile at different sizes as part of the rendering pass after a binning pass in which the GPU determined to which tiles vertices of primitives belong. The GPU may upsample the rendered image content based on the size at which GPU rendered the image content, and output the upsampled image content for later display.

24 Claims, 5 Drawing Sheets

(51) Int. Cl.
  *H04N 1/393* (2006.01)
  *G06T 15/80* (2011.01)

(56) References Cited

U.S. PATENT DOCUMENTS

| | | | | |
|---|---|---|---|---|
| 6,643,666 | B1* | 11/2003 | Kernz | G06Q 40/04 |
| 8,619,083 | B2 | 12/2013 | Nickolov et al. | |
| 8,724,914 | B2 | 5/2014 | Inada | |
| 9,384,619 | B2 | 7/2016 | Erol et al. | |
| 2004/0233219 | A1* | 11/2004 | Areas | G06F 3/0481 |
| | | | | 345/606 |
| 2006/0028400 | A1 | 2/2006 | Lapstun et al. | |
| 2006/0075034 | A1 | 4/2006 | Lakkala et al. | |
| 2007/0082707 | A1* | 4/2007 | Flynt | G06F 3/0481 |
| | | | | 455/564 |
| 2010/0226593 | A1* | 9/2010 | Gerhard | G06F 16/51 |
| | | | | 382/299 |
| 2010/0229115 | A1 | 9/2010 | Augustine et al. | |
| 2011/0087737 | A1 | 4/2011 | Smith | |
| 2011/0173570 | A1* | 7/2011 | Moromisato | G06F 17/30994 |
| | | | | 715/838 |
| 2011/0316884 | A1* | 12/2011 | Giambalvo | G06F 3/04815 |
| | | | | 345/660 |
| 2012/0139932 | A1* | 6/2012 | Sakamoto | G06F 3/0481 |
| | | | | 345/581 |
| 2012/0154277 | A1 | 6/2012 | Bar-Zeev et al. | |
| 2013/0016128 | A1* | 1/2013 | Bhatt | G06T 3/40 |
| | | | | 345/661 |
| 2014/0086309 | A1 | 3/2014 | Beer-Gingold et al. | |
| 2014/0247277 | A1* | 9/2014 | Guenter | G06T 11/40 |
| | | | | 345/611 |
| 2014/0267616 | A1 | 9/2014 | Krig | |
| 2015/0123993 | A1* | 5/2015 | Ohba | G09G 5/00 |
| | | | | 345/629 |
| 2015/0379727 | A1 | 12/2015 | Golas et al. | |
| 2016/0148424 | A1* | 5/2016 | Chung | G06T 15/005 |
| | | | | 345/423 |
| 2016/0212423 | A1 | 7/2016 | Aharon et al. | |
| 2016/0284119 | A1* | 9/2016 | Surti | G06T 1/60 |
| 2016/0350965 | A1* | 12/2016 | Lum | G06T 15/005 |
| 2016/0379606 | A1* | 12/2016 | Kollin | G02B 27/0093 |
| | | | | 345/428 |
| 2017/0085915 | A1 | 3/2017 | Kuusela | |
| 2017/0091897 | A1* | 3/2017 | Lee | G06T 1/20 |
| 2017/0124760 | A1* | 5/2017 | Murakawa | G06T 15/005 |
| 2017/0169602 | A1* | 6/2017 | Blackmon | G06T 15/005 |
| 2017/0200252 | A1* | 7/2017 | Nguyen | G06F 9/3871 |
| 2017/0236252 | A1* | 8/2017 | Nguyen | G06T 15/00 |
| | | | | 345/419 |
| 2017/0285736 | A1* | 10/2017 | Young | G06F 3/013 |
| 2017/0287112 | A1* | 10/2017 | Stafford | G06F 3/013 |
| 2017/0287446 | A1* | 10/2017 | Young | G06F 3/013 |
| 2018/0061116 | A1* | 3/2018 | Mitchell | G06F 3/012 |
| 2018/0081429 | A1* | 3/2018 | Akenine-Moller | G06F 3/011 |
| 2018/0082464 | A1* | 3/2018 | Akenine-Moller | G06T 15/005 |
| 2018/0089799 | A1* | 3/2018 | Johnson | G06T 3/403 |
| 2018/0137598 | A1* | 5/2018 | Spitzer | G06F 3/013 |
| 2018/0137602 | A1* | 5/2018 | Spitzer | G06T 3/4007 |
| 2018/0158251 | A1* | 6/2018 | Pasek | G06T 19/20 |
| 2018/0220068 | A1 | 8/2018 | Guenter | |
| 2018/0308455 | A1 | 10/2018 | Hicks et al. | |
| 2018/0350032 | A1 | 12/2018 | Bastani et al. | |
| 2018/0357809 | A1 | 12/2018 | Lawless et al. | |
| 2019/0172213 | A1 | 6/2019 | Wicks et al. | |

OTHER PUBLICATIONS

"Resolution—Is it possible to render part of the screen in different pixel density using openGL?—Game Development Stack Exchange," retrieved on Aug. 17, 2016 (1 page) retrieved at http://gamedev.stackexchange.com/questions/47722/isitpossibletorenderpartofthescreenindifferentpixeldensityusingope.

International Search Report and Written Opinion—PCT/US2017/057915—ISA/EPO—dated Jan. 29, 2018.

U.S. Appl. No. 01/172,786, by Robert VanReenen et al., filed Apr. 2, 2018.

Response to Written Opinion from corresponding PCT Application Serial No. PCT/US2017/057915 filed on Apr. 20, 2018 (7 pp).

El-Ganainy T., et al., "Streaming Virtual Reality Content", arxiv.org, Cornell University Library, 201 Olin Library Cornell University Ithaca, NY 14853, Dec. 26, 2016 (Dec. 26, 2016), XP080742938, pp. 1-8.

Guenter B., et al., "Foveated 3D Graphics", Proceedings ACM SIGGRAPH Asia, Nov. 2012, vol. 31, No. 6, XP055199808, 10 pages.

OptoVR: "Timewarp—Virtual Reality and Augmented Reality Wiki—VR & AR Wiki," Nov. 29, 2016 (Nov. 29, 2016), XP055486267, pp. 1-3, Retrieved from the Internet: URL:https://xinreality.comjmediawiki/index.php?title=Timewarp&oldid=18615 [retrieved on Jun. 20, 2018].

Funt B., et al., "Strategies for Foveated Compression and Transmission", Jul. 15, 2016, XP055508690, Retrieved from the Internet: URL:https://static.googleusercontent.com/media/research.google.com/en//pubs/archive/46452.pdf [retrieved on Sep. 21, 2018], 3 pages.

Second Written Opinion from International Application No. PCT/US2017/057915, dated Oct. 2, 2018, 10 pp.

International Preliminary Report on Patentability—PCT/US2017/057915, The International Bureau of WIPO—Geneva, Switzerland, Mar. 13, 2019 (7 pp).

"Resolution—Is it possible to render part of the screen in different pixel density using openGL?—Game Development Stack Exchange," retrieved on Aug. 17, 2016 (1 page) retrieved at http://gamedev.stackexchange.com/questions/4//22/isitpossibletorenderpartoflhescreenindifferentpixeldensityusingope.

* cited by examiner

FOVEATED RENDERING IN TILED ARCHITECTURES

TECHNICAL FIELD

This disclosure relates to graphics processing.

BACKGROUND

Computing devices often utilize a graphics processing unit (GPU) to accelerate the rendering of graphics data for display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU. Modern day CPUs are typically capable of concurrently executing multiple applications, each of which may need to utilize the GPU during execution.

SUMMARY

This disclosure is directed to foveated rendering of graphics content. A graphics processing unit (GPU) may render image content of a tile of an image surface to a size that is selected based on the resolution of the image content in that tile, rather than to the size of the tile. The GPU may repeat this for one or more tiles of the image frame, and then upsample the image content of the one or more tiles to the size of the tiles. In this manner, the GPU is able to achieve different resolutions in different portions of the image frame for foveation rendering.

In one example, the disclosure describes a method of foveation rendering, the method comprising determining that a first tile of an image surface is to include image content having a first resolution, wherein the first resolution is less than a second resolution for other tiles of the image surface, rendering the image content for the first tile at a size that is smaller than a size of the first tile and based on the first resolution of the image content in the first tile, upsampling the image content in the first tile to generate upsampled image content, and outputting the upsampled image content.

In one example, the disclosure describes a device for foveation rendering, the device comprising a system memory, and a graphics processing unit (GPU) comprising at least one of programmable or fixed-function circuitry, wherein the GPU is configured to determine that a first tile of an image surface is to include image content having a first resolution, wherein the first resolution is less than a second resolution for other tiles of the image surface, render the image content for the first tile at a size that is smaller than a size of the first tile and based on the first resolution of the image content in the first tile, upsample the image content in the first tile to generate upsampled image content, and output the upsampled image content for storage in the system memory.

In one example, the disclosure describes a device for foveation rendering, the device comprising means for determining that a first tile of an image surface is to include image content having a first resolution, wherein the first resolution is less than a second resolution for other tiles of the image surface, means for rendering the image content for the first tile at a size that is smaller than a size of the first tile and based on the first resolution of the image content in the first tile, means for upsampling the image content in the first tile to generate upsampled image content, and means for outputting the upsampled image content.

In one example, the disclosure describes a computer-readable storage medium having instructions stored thereon that when executed cause one or more processors of a device for foveation rendering to determine that a first tile of an image surface is to include image content having a first resolution, wherein the first resolution is less than a second resolution for other tiles of the image surface, render the image content for the first tile at a size that is smaller than a size of the first tile and based on the first resolution of the image content in the first tile, upsample the image content in the first tile to generate upsampled image content, and output the upsampled image content.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
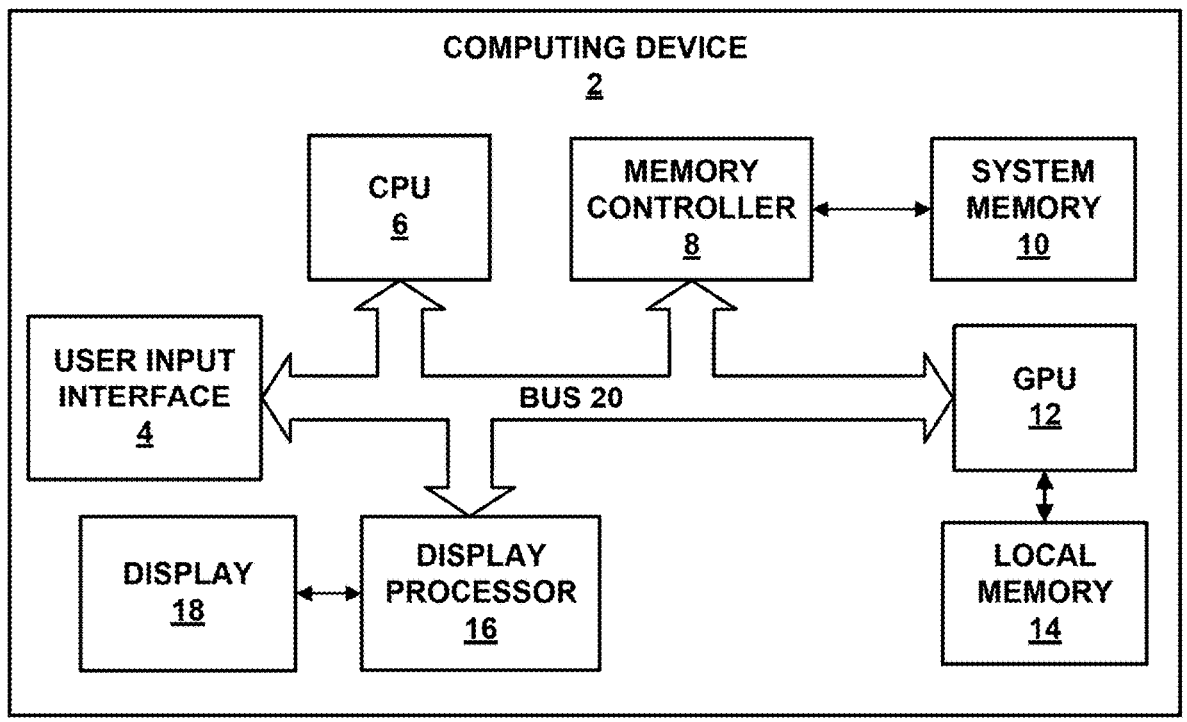
FIG. 1 is a block diagram illustrating an example computing device that may be used to implement the techniques of this disclosure.

Foveated rendering is a technique that aims to reduce fragment processing workload, bandwidth, and other rendering workloads by reducing the average resolution of a framebuffer while maintaining a high image quality by leaving the focal point of a rendering at full resolution. For example, in foveated rendering, different portions of the image frame are at different resolutions. This causes certain portions to appear blurrier than other portions.

Foveated rendering has the benefit of workload efficiency, reduced aliasing, reducing power, and better viewer experience. Generating lower resolution image content generally requires less processing than higher resolution image content, and therefore, foveation tends to reduce the overall amount of processing. Also, the image content creator may desire the viewer to focus on certain portions of the image (e.g., foreground vs. background) or there may be portions of less interest to the viewer. By making some portions of the image blurry and other portions sharp, the viewer may tend to shift attention to the sharper portions. Accordingly, foveation may be a tool to guide the viewer to view certain portions of the image.

A graphics processing unit (GPU) may be configured to perform the foveation rendering. Many graphics processing architectures use a two-pass processing scheme. In the first pass, referred to as a binning pass, the GPU divides an image frame into a plurality of bins (also referred to as tiles). The GPU determines which primitives (e.g., triangles) belong to which tiles in the binning pass. In the next pass, referred to as a rendering pass, the GPU renders the primitives on a tile-by-tile basis (e.g., render primitives on a per-bin basis).

In examples described in this disclosure, an application (e.g., a video game) executing on a central processing unit (CPU) may determine image resolutions of the different portions of the image frame for foveation rendering. In rendering each tile, the GPU may first determine the image resolution of the portion captured by that tile. Then, rather than rendering the image portion of that tile to be the same size as the tile (e.g., so that the image portion covers the entire tile), the GPU may render image content at a smaller size (e.g., less than the size of the tile). Then, to store the rendered data to a frame buffer, the GPU may upsample the rendered image content. The GPU may repeat this for each tile.

In some examples, the GPU may upsample the rendered image content as part of post-processing operations. Post-processing operations refer to operations performed on a frame after that frame has been generated. For example, adding blurring to the frame, converting the frame to black-and-white, and the like are examples of post-processing operations. Another example of post-processing operations is a timewarp pass. In a timewarp pass, the GPU may generate additional frames by modifying the just created frame such as by modifying the location of objects in the frame. In some examples, post-processing operations may apply to each pixel in the generated frame, but operations on each pixel are not necessary in every example.

A display processor, rather than the GPU, may perform the upsampling in some examples. For instance, the GPU may store the rendered image content at the smaller size (e.g., less than the size of the tile). The display processor may then upsample the image content of the tile as part of the operations of the display processor.

As an example to assist with understanding of how the GPU renders image content at a smaller size and then upsamples, assume that the image frame includes nine tiles (or bins) arranged in a 3×3 array of tiles. The image content of the top three tiles is $1/16^{th}$ resolution relative to a full resolution. The image content of the bottom three tiles, and the two tiles to the left and right of the center tile, are at $1/4^{th}$ resolution relative to a full resolution. The image content of the middle tile is full resolution.

In this example, for the image content in the top three tiles, the GPU may render the image content at $1/16^{th}$ size as that of the tile. Then, the GPU may upsample image content by 16× and store the resulting image content in the frame buffer. With upsampling, the image content may appear blurry because the resolution is the same relative to the smaller sized image content (e.g., one pixel in the $1/16^{th}$ sized image is represented by 16 pixels after upsampling). An interpolation filter may be used to optionally smooth pixel data as part of or after the upsampling. The GPU may perform similar operations with the bottom three tiles, and those on the left and right of the center tile, but with upsampling by a factor of 4. In this case, after upsampling, the bottom three tiles and those to the left and right of the center tile will appear sharper than those on the top because these tiles will have four times the resolution. For the center tile, the GPU may render the image content at full resolution such that the image content is the same size as the tile. The GPU may then combine all of the image content together to form the image frame for display having the different resolutions.

FIG. 1 is a block diagram illustrating an example computing device 2 that may be used to implement techniques of this disclosure. Computing device 2 may comprise a camera, a computer (e.g., personal computer, a desktop computer, a laptop computer, a tablet computer and/or a computer workstation), a video game platform or console, a mobile device such as wireless communication device (e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a set-top box, a broadcast receiver, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14 of GPU 12, a display processor 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a media editing application a video game application, a graphical user interface application, a teleconferencing application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6, forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated circuits or discrete logic circuits.

GPU 12 may be directly coupled to GPU local memory 14. Thus, GPU 12 may read data from and write data to GPU local memory 14 without necessarily using bus 20. In other words, GPU 12 may process data locally using local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. GPU local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display processor 16 may retrieve the data from the frame buffer and configure display 18 to display the image represented by the rendered image data. In some examples, display processor 16 may include a digital-to-analog converter (DAC) that is configured to convert the digital values retrieved from the frame buffer into an analog signal consumable by display 18. In other examples, display processor 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

In some examples, GPU 12 may generate image content at different image resolutions, in what is referred to as foveated rendering. As described in more detail, GPU 12 may first render image content at a pixel resolution lower than a full resolution, and then upsample the image content to generate upsampled image content. The image resolution of the upsampled image content may be less than the image resolution of a portion that GPU 12 rendered at full pixel resolution.

Pixel resolution and image resolution should not be confused. Pixel resolution refers to a number of pixels rendered for a portion of the image surface prior to upsampling. Image content having a higher pixel resolution means that there are more independently generated pixel values for pixels in the higher pixel resolution image content than independently generated pixel values for pixels in the lower pixel resolution image content. For example, a pixel shader may execute on a per-pixel basis to render each pixel for the portion. The upsampling may occur after the pixel shader generates pixel values. In upsampling, the pixel values of an upsampled pixel are generated based on the pixel values of another pixel.

The resulting upsampled image content has an associated image resolution. Image resolution is indicative of how sharp or blurry the final image content appears. In upsampling, pixel values for pixels are not independently generated, and rather final pixel values of neighboring pixels are used to copy, interpolate, or average to generate the pixel value of a pixel that is part of the upsampled image content. For instance, one way to upsample by a factor of four is to copy the pixel values for a pixel three times and generate pixel values of pixels that are right, bottom, and bottom-right to a current pixel in the upsampled image content.

Accordingly, upsampling may increase the number of pixels in a given area, but the image may not appear any sharper or clearer because no new, independently generated image content is added. Therefore, the image content in this upsampled portion may appear blurry due to the upsampling, and hence, the image resolution in that upsampled portion may be less than the image resolution in other portions. As described, image resolution of a portion is a measure of the detail the image portion holds. If GPU 12 adds additional pixels (e.g., via upsampling), but there is no increase in detail, the image resolution drops.

The image resolution may be inversely correlated to the amount of upsampling. The more upsampling that GPU 12 performs the lower the image resolution will be. For example, the image resolution of image content of a portion that GPU 12 upsampled by 16× is lower than the image resolution of image content of a portion that GPU 12 upsampled by 2× or did not need to upsample.

There may be various reasons why GPU 12 may generate image content at different image resolutions. As one example, rendering image content at lower pixel resolutions generally requires less power than rendering image content at higher pixel resolutions because there are fewer pixels to process in the lower pixel resolution image content. For example, GPU 12 consumes power every time a pixel shader executes. For a lower pixel resolution image content, there are fewer executions of the pixel shader because there are fewer pixels than for higher pixel resolution image content. Upsampling tends to require less power than generating independent pixel values (e.g., because there are fewer operations). Generating independent pixel values may require execution of instances of pixel shaders which are time- and power-intensive as compared to averaging or copying neighboring pixels as part of upsampling. Therefore, generating image content at a lower pixel resolution relative to full pixel resolution and then upsampling to generate image content at a lower image resolution relative to a full image resolution consumes less power than generating image content at the full image resolution.

As another example, generating image content at different image resolutions can be used to focus a viewer's attention to certain portions. Image content at higher image resolutions appears sharper than image content at lower image resolutions, and the viewer tends to automatically focus on the higher image resolution portion or portions. By causing GPU 12 to render image content at different pixel resolutions, that are then upsampled to generate image content at different image resolutions, content providers can ensure that the viewer is focused on particular areas, which may be of greater interest than other areas, resulting in a better viewing experience.

Therefore, in some cases, GPU 12 may perform foveated rendering to reduce power consumption due to processing or few pixels while generating image content at high resolution for portions where the viewer should be focusing. There may be additional reasons for foveated rendering, and the example techniques should not be considered limited to these particular reasons for foveated rendering.

The example techniques describe ways to perform foveated rendering, such as in examples where GPU 12 performs a two-pass processing scheme for graphics rendering. A first pass is referred to as a binning pass, in which GPU 12 determines which primitives belong to which bin (also called a tile) and which primitives are visible (e.g., generates visibility information). In a second pass, referred to as a rendering pass, GPU 12 renders each tile (e.g., bin) sequentially based on the determination of which primitives belong to which tile and the visibility of the primitives.

Such dual pass graphics processing architectures (sometimes referred to as streamout-based binning architectures) may be useful for various reasons. As one example, additional processing stages such as domain shaders, tessellation, and/or geometry shaders can be added to GPU 12, and there is efficient overlap of binning and rendering due to time-separated geometry and rasterization processing (e.g., GPU 12 may render one image surface while performing binning on the next surface).

In the example techniques described in this disclosure, GPU 12 may perform the binning pass, and then during the rendering pass, GPU 12 may render image content for each of the tiles based on the image resolution of the image content in that tile. For instance, CPU 6 may define the image resolutions for different portions of an image surface that GPU 12 is to render. In rendering a tile, GPU 12 may determine the image resolution of the image content for that tile based on the image resolution for the different portions as defined by CPU 6. GPU 12 may then render the image content that belongs to that tile based on the image resolution of the image content for that tile.

For example, the tile size of each tile may be N×N. If the image resolution of image content in a tile is to be a quarter resolution relative to a full resolution, then GPU 12 may render the image content having a pixel resolution of N/2× N/2 in the N×N tile (e.g., render the image content with size N/2×N/2 number of pixels). Therefore, there will be a quarter of the number of pixels in the image content that GPU 12 renders as compared to the number of pixels in tile. GPU 12 may then repeat these steps for each tile (e.g., render the image content in that tile based on the image resolution of the image content in that tile).

GPU 12 may upsample the image content in each tile to the size of the tile, and output the resulting upsampled image content to system memory 10. For example, GPU 12 may output the rendered image content for a tile to local memory 14 for storage, and may similarly store the image content for each tile to local memory 14. In this example, because of the different pixel resolutions, the size of the image content for a tile may be different than the size of the tile, and the size of the image content for the different tiles may be different. During writing of the image content from local memory 14 to system memory 10, GPU 12 may upsample the image content for the tiles so that the upsampled image content is the size of the tile.

To perform upsampling, GPU 12 may copy, interpolate, or average the pixel value of one or more pixels to pixels of the upsampled image content. For example, if the image content is N/2×N/2, then to upsample, GPU 12 may copy the pixel value of a pixel to the three neighboring pixels (e.g., the right, bottom, and right-bottom pixels), which essentially converts one pixel into four pixels. GPU 12 may perform some additional filtering, after upsampling, but such filtering is optional.

In some examples, GPU 12 may perform the upsample as part of post-processing operations rather than as part of writing the image content to system memory 10. For instance, after GPU 12 generates the image content of one or more tiles, as part of post-processing, GPU 12 may apply the post-processing operations (e.g., blurring, converting to black-and-white, timewarping, etc.), and as part of the post-processing operations, GPU 12 may upsample the image content of the one or more tiles. As another example, GPU 12 may generate the image content for each tile, and after generating the image content for each tile of the frame, GPU 12 may upsample as part of post-processing operations. In some examples, GPU 12 may store the image content without upsampling, and display processor 16 may upsample as part of writing to display 18.

GPU 12 may determine that a set of tiles of an image surface are to include image content having an image resolution that is less than an image resolution for other image content of the image surface (e.g., less than a full resolution). GPU 12 may render the image content for the set of tiles at a size that is smaller than a size of each of the tiles and based on the image resolution of the image content in the set of tiles. For example, GPU 12 may determine that the image resolution for a first tile is $1/16^{th}$ of the full resolution, and render image content for the first tile having a pixel resolution of N/4×N/4 (e.g., size of N/4×N/4), where N×N is the size of the tile, and therefore, N/4×N/4 is smaller than N×N. GPU 12 may upsample the image content in the set of tiles to generate upsampled image content having the same size as the size of each of the tiles, and output the upsampled image content to system memory 10, as an example.

There may be various ways in which GPU 12 determines the image resolution of different portions of the image surface. As one example, CPU 6 may define the pixel resolutions for each portion because when the portions are upsampled, the resulting image resolution will be the image resolution for those portions. In this example, the pixel resolutions and the image resolutions may be the same (e.g., having a pixel resolution of N/2×N/2 for a tile is effectively the same as defining the image resolution to be a quarter image resolution). As another example, CPU 6 may define the image resolutions for the portions of the image surface. CPU 6 may define a shape (e.g., rectangle, triangle, oval, or some other polygon) and its coordinates, and may define the image resolution for the portion either in absolute terms (e.g., number of pixels that should be rendered for that portion prior to upsampling) or relative terms (e.g., some factor of a full image resolution). As an example, CPU 6 may define bands of resolutions (e.g., bands having different levels of foveation). For the center of the image surface, CPU 6 may define a circle having no foveation (e.g., full image resolution), for a circular band (e.g., ring) around the circle, CPU 6 may define a quarter resolution, and so forth, as a way to define different resolutions (e.g., amount of foveation) for different portions of the image surface.

CPU 6 may output information about the shape and location of the portion having the particular image resolution. GPU 12 may determine the image resolution for the image content in a tile based on the information of the shape and location of the different portions of the image surface and the location of the tile in the image surface.

In some cases, rather than CPU 6 defining the size and shape of an image portion and a particular image resolution for that portion, GPU 12 may be configured to define the size and shape of an image portion and its image resolution. For example, GPU 12 may be configured to define a circle with a radius R in the center of the image surface as having a first image resolution, a ring with width W0 around the circle as having a second image resolution, a ring width W1 around the ring with width W0 as having a third image resolution, and so forth. Other possible ways to define the image resolution are possible and the example techniques should not be considered limited to these examples.

The size and/or shape of an image portion having a particular image resolution may not be the same as the size and/or shape of a tile. For example, assume that CPU 6 defines an image portion as an oval that partially fits within a tile. In this example, CPU 6 may define the oval image portion within the tile as having a first resolution that is less than a second resolution for the remaining image portion within the tile.

In one or more examples, GPU 12 may render image content such that image content in a tile has the same image resolution throughout (e.g., all the image content in a tile has the same image resolution). Although CPU 6 may have defined two different resolutions for image content in the same tile (e.g., first resolution and second resolution), GPU 12 may render image content such that the pixel resolution of the image content in that tile is uniform. Accordingly, in this example, GPU 12 may determine whether to render the tile at the first resolution, the second resolution, or some other resolution that is uniform for the tile.

In cases where the image portion having a particular image resolution does not encompass the entire tile, GPU 12 may utilize various factors to determine the resolution at which to render the image content of that tile. As one example, GPU 12 may determine the portion of the image content that encompasses a majority or plurality of the tile, determine the image resolution for that portion, and render the image content of the tile at a pixel resolution such that when the image content is upsampled the image resolution of that image content is equal to the determined image resolution. As another example, GPU 12 may determine the portion of the image content in the tile having the highest resolution, determine the image resolution for that portion, and render the image content of the tile at a pixel resolution such that when the image content is upsampled the image resolution of that image content is equal to the determined image resolution. As another example, GPU 12 may determine an average or weighted average (e.g., larger portions are weighted more heavily) of the different image resolutions of the different image portions within the tile to determine an average image resolution, and render the image content of the tile at a pixel resolution such that when the image content is upsampled the image resolution of that image content is equal to the determined average image resolution. There may be other ways in which GPU 12 determines the image resolution for a tile, and the techniques should not be considered limited to the above examples.

In one or more of the above examples, the image resolutions for certain image portions may be different than the image resolution defined by CPU 6. For example, in the above example, for a tile there was image content having a first image resolution (e.g., oval of image content) that is less than the image content having a second image resolution (e.g., the remaining portions of the tile). If GPU 12 or CPU 6 determines that the image content for the tile should have an image resolution equal to the second image resolution, then although CPU 6 defined the oval of image content as having the first image resolution, the actual generated image resolution for the oval of image content may be equal to the second image resolution. Conversely, if GPU 12 or CPU 6 determines that the image content for the tile should have an image resolution equal to the first image resolution, then although CPU 6 defined the other portions of the tile excluding the oval of image content as having the second image resolution, the actual generated image resolution for the portions of the tile executing the oval of image content may be equal to the first image resolution.

To generate image content having a particular image resolution, GPU 12 may first render image content at a lower pixel resolution, and then upsample the image content (or display processor 16 may perform the upsampling). One way to render image content at a lower pixel resolution is to render image content to a size smaller than a size of the tile. One example way for GPU 12 to render image content to a size smaller than the size of a tile is to define the viewport to which GPU 12 is to render to be the smaller size. For example, if GPU 12 is to render to a size N/2×N/2, where N×N is the size of the tile, then GPU 12 may define the viewport as (x, y) to ((x+N/2)),(y+N/2)), where x is the x-coordinate for the top-left corner of the tile and y is the y-coordinate for the top-left corner of the tile. In some examples, CPU 6 may define the viewport, rather than GPU 12. As another example, an application executing on CPU 6 may define the viewport without any change in the size (e.g., define the viewport to be the size of the tile), and a graphics driver executing on CPU 6 or a controller of GPU 12 may then modify the command that defines the viewport to resize the viewport to the smaller size. Other possible techniques to cause GPU 12 to render image content to a size smaller than the size of the tile are possible, and the techniques should not be considered limited to the above examples.

Accordingly, the example techniques provide for a way for GPU 12 to foveated render image content such that different portions of an image surface are at different image resolutions. For instance, rather than rendering image content to snap to a tile (e.g., be the same size of a tile), GPU 12 may render image content of the tile to a size smaller than the tile, where the size to which GPU 12 renders is based on the image resolution of the image content in that tile and the size of the tile. If the size of the tile is N×N, and the image resolution is to be half the full resolution, then GPU 12 may render the image content for that tile to (N×N)(½) (i.e., N/2×N or N×N/2). In this example, the pixel resolution is N×N/2 or N/2×N. Again, the pixel resolution defines the number of pixels that are rendered in a given area, and the image resolution defines the amount of detail in the image content. GPU 12 may upsample the image content rendered to the smaller size so that the resulting upsampled image content is the same size as that of the tile. GPU 12 may repeat these operations for each of tiles.

In some examples, the upsampling does not add any new additional image content to the image surface, but is rather performed by copying, interpolating, or averaging pixel values based on pixel values of neighboring pixels. The amount of upsampling needed may be directly correlated with how blurry or sharp the portion appears. For example, a portion of image content that is 16× upsampled will appear blurrier than a portion of image content that is 4× upsampled. By rendering image content of a tile to a size smaller than the size of the tile and then upsampling to the size of the tile results in image content having different image resolutions in different portions of the image surface.

Figure 2:
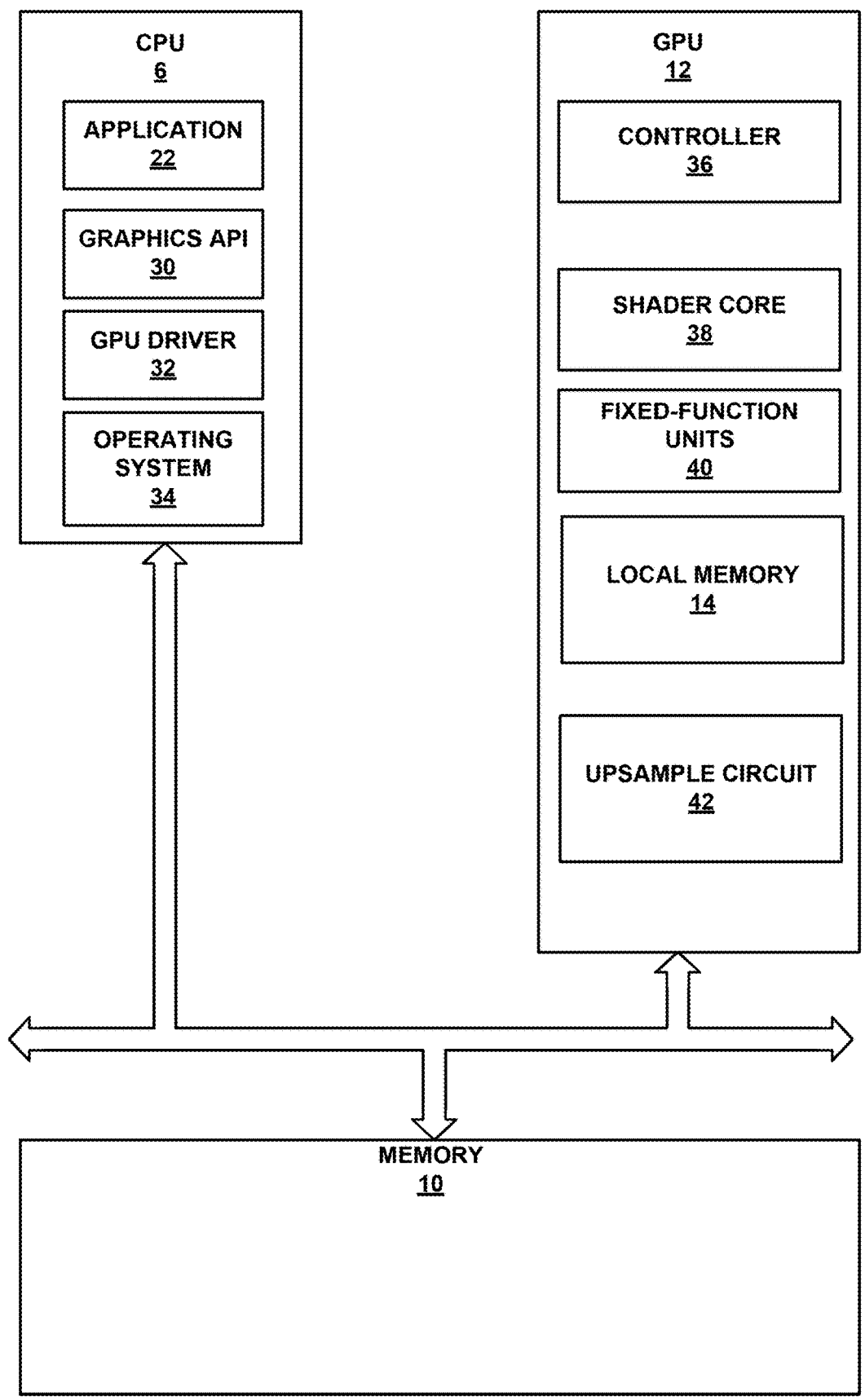
FIG. 2 is a block diagram illustrating a CPU, a GPU and a memory of the computing device of FIG. 1 in further detail.

FIG. 2 is a block diagram illustrating CPU 6, GPU 12 and memory 10 of computing device 2 of FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC). CPU 6 is configured to execute application 22, a graphics API 30, a GPU driver 32, and an operating system 34.

GPU 12 includes a controller 36, shader core 38, one or more fixed-function units 40, and upsample circuit 42. For ease, local memory 14 is also illustrated as being a part of GPU 12 but may be external as well. Although illustrated as separate components, in some examples, upsample circuit 42 may be part of fixed-function units 40. Upsample circuit 42 may upsample the image content stored in local memory 14 for a tile and output the upsampled image content to memory 10.

Also, in some examples, upsample circuit 42 may be part of display processor 16. For ease of description, upsample circuit 42 is illustrated as part of GPU 12. In examples where upsample circuit 42 is part of display processor 16, upsample circuit 42 may operate in a manner described below.

Software application 22 may include at least some of one or more instructions that cause graphic content to be displayed or one or more instructions that cause a non-graphics task (e.g., a general-purpose computing task) to be performed on GPU 12. Software application 22 may issue instructions to graphics API 30. Graphics API 30 may be a runtime service that translates the instructions received from software application 22 into a format that is consumable by GPU driver 32. In some examples, graphics API 30 and GPU driver 32 may be part of the same software service.

GPU driver 32 receives the instructions from software application 22, via graphics API 30, and controls the operation of GPU 12 to service the instructions. For example, GPU driver 32 may formulate one or more command streams, place the command streams into memory 10, and instruct GPU 12 to execute command streams. GPU driver 32 may place the command streams into memory 10 and communicate with GPU 12 via operating system 34 (e.g., via one or more system calls).

Controller 36 is configured to retrieve the commands stored in the command streams, and dispatch the commands for execution on shader core 38 and one or more fixed-function units 40. Controller 36 may dispatch commands from a command stream for execution on one or more fixed-function units 40 or a subset of shader core 38 and one or more fixed-function units 40. Controller 36 may be hardware of GPU 12, may be software or firmware executing on GPU 12, or a combination of both.

Shader core 38 includes programmable circuitry (e.g., processing cores on which software executes). One or more fixed-function units 40 include fixed function circuitry configured to perform limited operations with minimal functional flexibility. Shader core 38 and one or more fixed-function units 40 together form a graphics pipeline configured to perform graphics processing.

Shader core 38 may be configured to execute one or more shader programs that are downloaded onto GPU 12 from CPU 6. A shader program, in some examples, may be a compiled version of a program written in a high-level shading language (e.g., an OpenGL Shading Language (GLSL), a High Level Shading Language (HLSL), a C for Graphics (Cg) shading language, etc.). In some examples, shader core 38 may include a plurality of processing units that are configured to operate in parallel (e.g., a SIMID pipeline). Shader core 38 may have a program memory that stores shader program instructions and an execution state register (e.g., a program counter register) that indicates the current instruction in the program memory being executed or the next instruction to be fetched. Examples of shader programs that execute on shader core 38 include, for example, vertex shaders, pixel shaders (also referred to as fragment shaders), geometry shaders, hull shaders, domain shaders, compute shaders, and/or unified shaders.

Fixed-function units 40 may include hardware that is hard-wired to perform certain functions. Although the fixed function hardware may be configurable, via one or more control signals, for example, to perform different functions, the fixed function hardware typically does not include a program memory that is capable of receiving user-compiled programs. In some examples, one or more fixed-function units 40 may include, for example, processing units that perform raster operations (e.g., depth testing, scissors testing, alpha blending, etc.).

GPU driver 32 of CPU 6 may be configured to write the command streams to memory 10, and controller 36 of GPU 12 may be configured to read the one or more commands of command streams from memory 10. In some examples, one or both of command streams may be stored as a ring buffer in memory 10. A ring buffer may be a buffer with a circular addressing scheme where CPU 6 and GPU 12 maintain synchronized state variables associated with the writing of data to and reading of data from the ring buffer. For example, if the first command stream is a ring buffer, each of CPU 6 and GPU 12 may store a write pointer indicating the next address to be written to in the ring buffer, and a read pointer indicating the next address to be read from in the ring buffer.

When CPU 6 writes a new command to the ring buffer, CPU 6 may update the write pointer in CPU 6 and instruct GPU 12 to update the write pointer in GPU 12. Similarly, when GPU 12 reads a new command from the ring buffer, GPU 12 may update the read pointer in GPU 12 and instruct CPU 6 to update the read pointer in CPU 6. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 32 and an example GPU controller 36 will now be described with respect to FIG. 2. GPU driver 32 receives one or more instructions from software application 22 that specify graphics operations and/or general-purpose computing operations to be performed by GPU 12. GPU driver 32 places the output command stream into memory 10, which is accessible by GPU controller 36. GPU driver 32 notifies GPU controller 36 that the command stream corresponding to software application 22 is available for processing. For example, GPU driver 32 may write to a GPU register (e.g., a GPU hardware register polled by GPU 12 and/or a GPU memory-mapped register polled by GPU 12) one or more values indicating that the command stream is ready for execution.

Upon notification that the command stream is ready for execution, controller 36 of GPU 12 may determine if resources are currently available on GPU 12 to begin executing the command stream. If resources are available, controller 36 begins to dispatch the commands in the command stream.

As part of graphics processing, CPU 6 may offload certain graphics processing tasks to GPU 12. For instance, application 22 may generate attribute data for attributes of a plurality of vertices of primitives that interconnect to form a graphical object. Application 22 may store the attribute data in a vertex buffer in memory 10. GPU driver 32 may instruct controller 36 to retrieve the attribute data for the attributes of the vertices for processing to generate graphics data for display.

In examples described in this disclosure, application 22 generates image resolution information that GPU driver 32 is to transmit to GPU 12. The image resolution information defines the image resolution for different portions of the image surface that GPU 12 is to generate.

As an example, application 22 may define bands of image resolutions. For image content in a particular band, GPU 12 may render the image content based on the band to which the image content belongs. For example, GPU 12 may determine a band to which vertices of a primitive belong, and render the primitive based on the image resolution for the band in which the vertices of the primitive belong. For portions of high interest, application 22 may define a relatively high image resolution, and for portions of low interest, application 22 may define a relatively low image resolution.

As another example, application 22 may define image resolution for each of the vertices as part of the attribute data stored in the vertex buffer. In this example, for vertices of primitives that are located in portions with higher areas of interest (e.g., where the viewer should be viewing), application 22 may define those areas as having relatively high image resolution, and other portions with lower areas of interest as having relatively low image resolution.

The definition of the image resolution may be a ratio relative to a full image resolution. For example, the definition of the image resolution may be $\frac{1}{4}^{th}$ resolution, $\frac{1}{16}^{th}$ resolution, etc. The definition of the image resolution as a ratio (e.g., $114^{th}$, $\frac{1}{16}^{th}$, etc.) may be synonymous with defining a pixel resolution as a ratio.

For example, full pixel resolution refers to the number of pixels on display 18. If display 18 is 2048 pixels wide and 1536 pixels wide, and GPU 12 renders an image surface having 2048 pixels by 1536 pixels, then the image surface is at full pixel resolution. If, however, GPU 12 renders the image surface having 128 pixels by 96 pixels, GPU 12 rendered the image surface at $\frac{1}{256}^{th}$ pixel resolution (e.g., 2048/16×1536/16). If GPU 12 then upsamples the image surface having the $\frac{1}{256}^{th}$ pixel resolution by a factor 256×, then the resulting upsampled image will include 2048×1536 pixels, but the image resolution will be $\frac{1}{256}^{th}$ the full image resolution. As a comparison, the image surface having the $\frac{1}{256}^{th}$ pixel resolution that is upsampled will appear blurrier than the image surface having the full pixel resolution. This is because there is less detail in the upsampled image content since the upsampling generates pixel values for pixels based on already existing pixel values instead of generating independent new pixel values.

Although the above description of the image resolution and the pixel resolution is described with respect to the full image surface, the same concept applies to a portion of the image surface. For example, if image content is to be rendered to an N×N sized tile, and the image resolution information from application 22 indicates that the image resolution for the image content in the N×N sized tile is quarter resolution, then rendering the image content to a size N/2×N/2 and then upsampling by a factor of four results in the image content for that tile having a quarter image resolution.

In examples where application 22 defines the image resolution on a vertex basis, application 22 may define the image resolution for each primitive as additional attribute data for vertices of that primitive. Because there is a plurality of primitives in the image surface, there will be a plurality of image portions having different image resolutions. For example, application 22 may define that a first group of primitives are to be at a first image resolution, a second group of primitives are to be at a second image resolution, and so forth, including a group of primitives that are to be at a full image resolution.

Each of the groups of primitives having the different image resolutions may form respective shapes (e.g., ovals). Accordingly, application 22 in some examples may define different image resolutions for different portions of the image surface, where each portion is of a particular polygonal shape (e.g., oval, rectangle, etc.). There may be various other ways for application 22 to define the image portions having the different image resolutions (e.g., including bands of image resolutions), and use of vertex attributes of vertices for the image resolution information is one example.

As described above, GPU 12 may be configured to generate image content in two passes: binning pass and rendering pass. In the binning pass, GPU driver 32 and/or controller 36 may define a size of a tile (also referred to as a bin), where each tile is of size N×N (e.g., N×N number of pixels). The tiles need not be square or all be the same size. For ease of description, the following is described with respect to square tiles having the same size.

Controller 36 may then cause shader core 38 and fixed-function units 40 to perform respective operations to determine which primitives belong in which tile and which vertices are visible. In the rendering pass, controller 36 may cause shader core 38 and fixed-function units 40 to perform respective operations on a per-tile basis to render the image content on a tile-by-tile basis. GPU 12 stores the resulting image content in memory 10 for retrieval and display.

Part of the graphics processing includes vertex processing that is generally performed by GPU 12 executing a vertex shader on shader core 38. For instance, the vertex shader may perform coordinate conversion, lighting, shading, and other such processes on the attribute data of the attributes of each vertex. Application 22 may be bound with a vertex shader, and application 22 may issue the command via GPU driver 32 that instructs controller 36 to retrieve object code for a vertex shader for execution on shader core 38.

GPU 12 may execute the vertex shader as part of the binning pass. The vertex shader may receive vertex coordinates for the primitives as defined by application 22 and generate vertex coordinates for primitives that are part of the viewing area. A binning circuit, which may be part of fixed-function units 40, may determine to which tiles each of the primitives belongs. For example, the binning circuit may receive information indicative of the size of display 18 (e.g., number of pixels horizontally of display 18 by number of pixels vertically of display 18). Based on the size of display 18, the binning circuit may convert the coordinates provided by the vertex shader into coordinates on display 18. The size of display 18 may be stored in local memory 14 or memory 10.

In addition, the binning circuit may divide the image surface into a plurality of tiles. The image surface may be the size of the display 18. GPU driver 32 may define the number of tiles that the binning circuit is to divide the image surface. Based on the number of tiles and the size of display 18, the binning circuit may determine the size of each tile and the position of each tile in the image surface. As an example, if the size of display 18 is 100 pixels by 100 pixels, and GPU driver 32 defines that the image surface is to be divided into 100 tiles, then the binning circuit may determine that there are 100, 10 pixels by 10 pixel tiles arranged contiguously.

Based on the size of each tile, the position of each tile in the image surface, and the coordinates of the vertices on display 18, the binning circuit may determine which vertices belong to which tile. For example, keeping with the 100, 10 pixel by 10 pixel tiles example, if the binning circuit determines that the x and y coordinates for a vertex are 25 and 35, respectively, then the binning circuit may determine that this vertex is located at tile (2, 3) (i.e., right second tile and bottom third tile). In this example, 25/10 indicates that the tile is located second tile from the right, and 35/10 indicates that the tile is located third tile from top.

In some examples, two vertices outputted by the vertex shader may be located at the same x, y coordinate, but at a different z coordinate. The z coordinate indicates depth. A depth test circuit may receive coordinate information from the binning circuit of which vertices belong to which tiles. For vertices having the same x, y coordinate, the depth test circuit may determine which vertex is occluded by which vertex based on the respective z coordinates. If a vertex or primitive is occluded, that vertex or primitive may be discarded from further processing. For instance, the depth test circuit may not output attribute data for vertices or primitives that are occluded to memory 10. The order of operation of the binning circuit and depth test circuit is provided as an example, and the order of operation may be reversed. The depth test circuit may first determine whether vertices or primitives are occluded and remove those vertices from further processing, and the binning circuit may then determine to which tiles vertices belong.

In either example (e.g., binning and then depth test or depth test and then binning), the result may be information indicating to which tiles the primitives belong. Also, the remaining vertices (e.g., those not discarded) may be vertices that contribute to the final image surface. These operations may conclude the binning pass. Accordingly, at the end of the binning pass there is visibility information of which vertices belong to which tiles (e.g., which vertices that contribute to content in the image surface belong to which tiles).

GPU 12 may store the information of which vertices belong to which tile in memory 10, possibly as additional attribute data. For example, each tile may be associated with a position in a digital value (e.g., first tile is associated with last bit in digital value, second tile is associated with second to last bit in digital value, and so forth). For each vertex, the binning circuit may determine a digital value that indicates the tile to which that vertex belongs. A digital one for the bit, which is associated with a particular tile, in the digital value of a vertex means that the respective vertex belongs to that tile. For example, assume nine tiles, which means that for each vertex that belongs to the first tile, the binning circuit may store the following digital value as additional attribute data for that vertex: 000000001. In this example, the first tile is associated with the last bit in the digital value, and therefore, that bit is a digital (e.g., binary) one and the rest are a digital zero for vertices that belong to the first tile. If the vertex belonged to the third tile, the binning circuit may store the following digital value as additional attribute data for that vertex: 000000100 (e.g., the third from last digital bit is a digital one because the third from last digital bit is associated with the third tile).

Next for the rendering pass, GPU 12 may render the primitives formed by the vertices in each of the tiles. GPU 12 may perform such rendering on a tile-by-tile basis. For instance, GPU 12 may render the image content of the first tile, then the second tile, and so forth. At the conclusion of writing the image content of first tile, GPU 12 may store the image content in local memory 14, and repeat these operations until there are no more tiles to render. As described in more detail, upsample circuit 42 upsamples the image content in one or more of the tiles as part of outputting the image content to memory 10. In some other examples, GPU 12 may upsample and output the image content to memory 10 after the rendering of each tile, rather after the rendering of all tiles.

To render image content, GPU 12 determines pixel values (e.g., color and opacity) for each of the pixels in each of the tiles. One way in which GPU 12 renders the pixels in each of the tiles is by defining the area within the tile to which the image content is to be rendered. If GPU 12 renders the image content in each of the tiles to the size of the tile, GPU 12 may render the image content to full pixel resolution.

However, in accordance with the techniques described in this disclosure, rather than rendering the image content of a tile to the size of the tile, GPU 12 may render the image content to a size smaller than the tile. The size to which GPU 12 renders the image content of a tile may be based on the image resolution of the vertices in the tile.

As described above, application 22 may define the resolution bands. At the conclusion of the operations of the vertex shader, GPU 12 may determine to which band vertices in the tile belong. The resolution bands to which the vertices belong may define the image resolution for the image content in that tile.

In some examples, application 22 may define the image resolution for the vertices. During the operations performed by the vertex shader, the vertex shader may keep the definition of the image resolution of vertices assigned to the vertices. Then during the rendering, for all the pixels that belong to the primitive defined by its vertices, GPU 12 may render these primitives to a size that is proportional to the size of the tile based on the defined image resolution.

For example, if a majority or plurality of vertices within a first tile fall in the band having a quarter image resolution or are defined as having a quarter image resolution, and the size of the tile is N×N, then GPU 12 may render the image content of the first tile to a size that is quarter the size of the tile (e.g., N/2×N/2). In this example, the size to which GPU 12 renders the image content of the first tile is N/2×N/2 which is proportional to the size of tile (e.g., proportional to N×N) and based on the defined image resolution (e.g., quarter resolution). In this example, GPU 12 may multiply the size of the tile with the ratio of the image resolution (e.g., N×N multiplied by quarter is N/2×N/2).

One example way in which GPU 12 may render the image content of the first tile to N/2×N/2 is based on a defined viewport. For instance, as part of rendering the image content, GPU 12 receives a command that defines the viewport within which GPU 12 is to render the image content. For full pixel/image resolution, the viewport command (e.g., a glViewport command of OpenGL) may define the viewport to which GPU 12 renders the image content as the size of the tile (e.g., N×N). However, for a size smaller than the size of the tile that is based on the image resolution, the viewport command may define the viewport as N/2×N/2.

In some examples, because application 22 may not be configured to determine to which tile various primitives will be rendered, application 22 may not be configured to issue the viewport command that defines the viewport for that tile to a size smaller than that tile. Therefore, application 22 may issue the viewport command without instructing GPU 12 to render the image content to a smaller size.

GPU driver 32 may capture the viewport command issued by application 22 and modify the viewport command to define the viewport to a smaller size that is proportional to the size of the tile and the defined image resolution. For example, as described above, GPU driver 32 may be tasked with outputting the commands that application 22 issues to GPU 12 that GPU 12 executes. Application 22 may define the viewport command, and GPU driver 32 may receive the viewport command and modify the viewport command to set the viewport to the actual viewport to which GPU 12 is to render the image content (e.g., modify the viewport from N×N to N/2×N/2).

Based on the defined viewport for a tile, GPU 12 may render the image content of that tile to the area defined by the viewport for that tile. For example, GPU 12 may rasterize the primitives and define the pixels within the primitives based on the defined viewport size. For each pixel within the primitive, GPU 12 may execute a pixel shader that determines the pixel values for respective pixels. The pixel shader may output the resulting pixel values for pixels within the viewport to local memory 14.

GPU 12 may repeat these operations for each of the tiles. Accordingly, local memory 14 may store the image content for each tile. However, the size of the image content for any tile need not necessarily be the same size as the tile, and may be less than the size of the tile. For example, if the image resolution for the first tile is quarter (e.g., as application 22 defining the image resolution band that happens to be in the first tile as quarter image resolution), then the size of the image content for the tile may be a quarter of the size of the first tile. If the image resolution for the second tile is one-sixteenth, then the size of the image content for the tile may be a sixteenth of the size of the second tile, and so forth. This may conclude the rendering pass.

For some tiles, it may be possible that GPU 12 rendered image content to the size of those tiles. Application 22 may have defined some vertices to have full image resolution because those vertices are for primitives where the viewer should be focusing. Therefore, GPU 12 may render some tiles to full pixel resolution (e.g., to a size equal to the size of the tile) because the image content in those tiles is to have full image resolution and may render some tiles to less than full pixel resolution (e.g., to a smaller size than size of the tile) because the image content in those tiles is to have less than full image resolution (e.g., one-half, one-quarter, one-eighth, one-sixteenth image resolution, and so forth).

Upsample circuit 42 may be configured to output the respective image content from each of the tiles to memory 10. However, as part of outputting the image content for each tile, upsample circuit 42 may upsample the image content for one or more tiles. For instance, if GPU 12 rendered image content for a first tile to quarter pixel resolution, upsample circuit 42 may read pixel values for a first pixel in the rendered image content from local memory 14, and store the pixel values for the first pixel four times to represent the pixel values for four pixels on the image surface. Then upsample circuit 42 may read pixel values for a second pixel in the rendered image content from local memory 14, and store the pixel values for the second pixel four times to represent the pixel values for the next four pixels on the image surface, and so forth.

In this way, upsample circuit 42 may upsample the image content in a tile to generate upsampled image content. Upsample circuit 42 may upsample the image content based on the size of the rendered image content for the tile and the size of the tile. Upsample circuit 42 may output the upsampled image content to memory 10 for storage, and for display processor 16 to retrieve and display on display 18.

In the above example, upsample circuit 42 upsamples as part of outputting the image content to memory 10. However, in some examples, upsample circuit 42 may upsample the image content of a tile, store the upsampled image content in local memory 14, and then output the upsampled image content to memory 10. Also, in some examples, upsample circuit 42 may not wait until image content for all tiles is rendered before upsampling and outputting to memory 10. In these examples, after GPU 12 renders image content of a first tile, upsample circuit 42 may upsample and output the upsampled image content for the first tile before GPU 12 renders or in parallel with GPU 12 rendering image content for a second tile.

Figure 3:
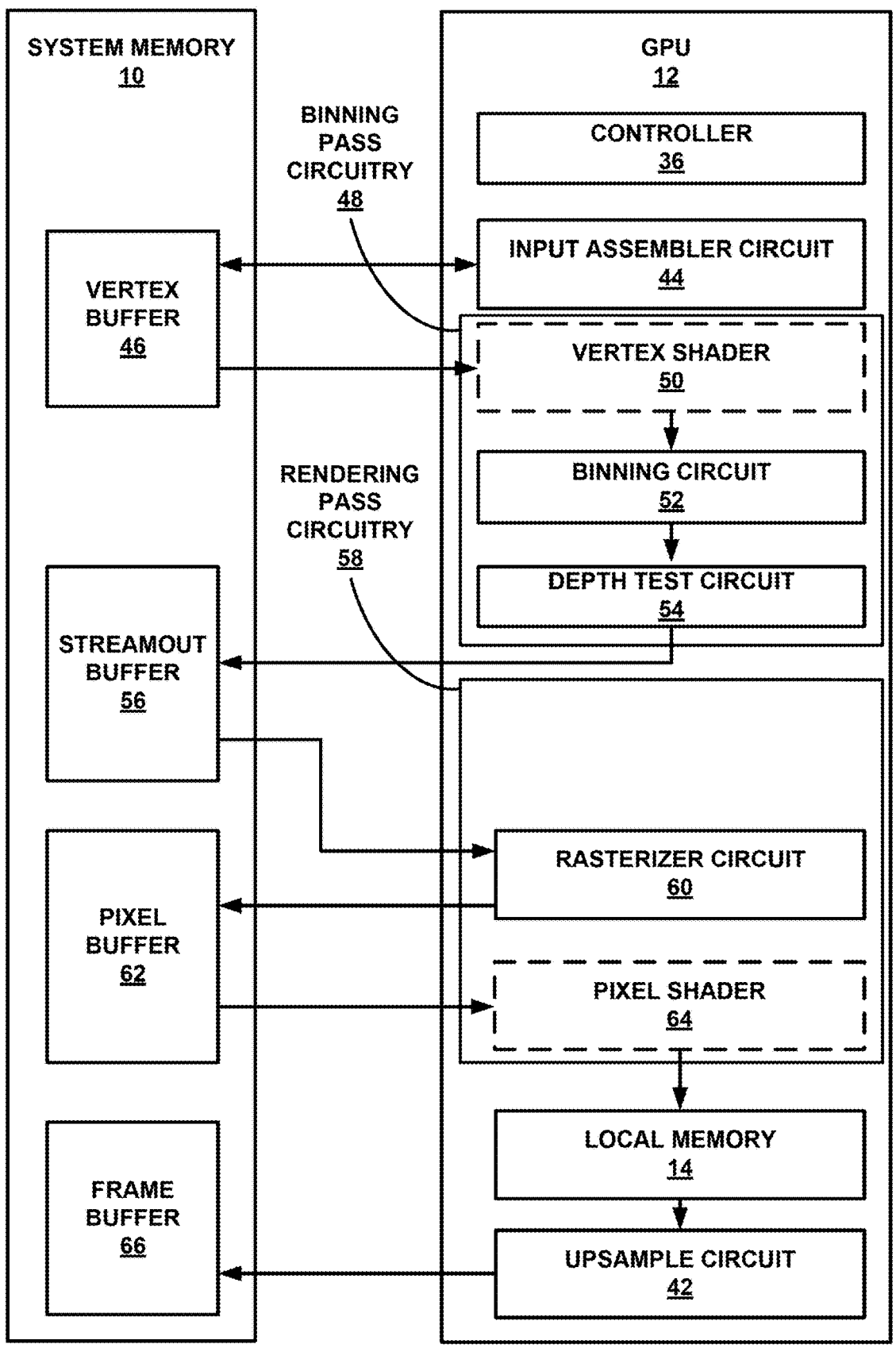
FIG. 3 is a block diagram illustrating a GPU and a memory of the computing device of FIG. 1 in further detail.

FIG. 3 is a block diagram illustrating a GPU and a memory of the computing device of FIG. 1 in even further detail. To perform graphics operations, GPU 12 may implement a graphics processing pipeline. The graphics processing pipeline includes performing functions as defined by software or firmware executing on GPU 12 and performing functions by fixed-function units that are fixed hardware configured to perform very specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

In this example, GPU 12 may include one or more of controller 36, input assembler circuit 44, binning pass circuitry 48, and rendering pass circuitry 58. Binning pass circuitry 48 includes vertex shader 50, which is illustrated in dashed lines to indicate that vertex shader 50 executes on shader core 38 (FIG. 2) of GPU 12. For example, binning pass circuitry 48 includes shader core 38 on which vertex shader 50 executes. Binning pass circuitry 48 also includes binning circuit 52 and depth test circuit 54. Rendering pass circuitry 58 includes rasterizer circuit 60, and pixel shader 64, which is illustrated in dashed lines to indicate that pixel shader 64 executes on shader core 38. In the illustrated example, local memory 14 is illustrated as internal to GPU 12 but may be external to GPU 12. GPU 12 also includes upsample circuit 42, which upsamples and outputs rendered image content from each of the tiles.

Shader core 38 may execute other types of shaders as well such as a hull shader and domain shader that follow the vertex shader stage in that order, and are used for tessellation. Tessellation circuitry may also be included in one or more fixed-function units 40 for performing the tessellation. Shader core 38 may also execute a geometry shader that receives the output of the domain shader, if shader core 38 executes the domain shader, or the output of a vertex shader, if no domain shader is executed. Rasterizer circuit 60 may receive graphics data generated by vertex shader 50 or from the geometry shader (when available) or domain shader (when available).

Other configurations of the graphics pipeline are possible, and the techniques described in this disclosure should not be considered limited to the specific example illustrated in FIG. 3. For example, GPU 12 may include more stages than those illustrated, and in some examples, GPU 12 may not necessarily include all of the illustrated stages. Also, the specific ordering of the stages is provided for purposes of illustration and should not be considered limiting.

FIG. 3 also illustrates the various buffers in memory 10 used to store intermediate graphics data as the graphics data is being generated through the graphics pipeline of GPU 12. As illustrated, memory 10 includes vertex buffer 46, streamout buffer 56, pixel buffer 62, and frame buffer 66. These buffers may be part of the same larger buffer or may be separate buffers.

Application 22 may cause CPU 6 (e.g., via GPU driver 32) to output vertex data (e.g., attribute data) of vertices to vertex buffer 46. In some examples, the attribute data for the vertices may include image resolution information that indicates the relative image resolution of the primitives formed by the vertices. For example, for primitives that are for image portions where the viewer should focus, application 22 may define a relatively high level of image resolution, including full resolution. For primitives that are for image portions where the viewer should not focus, application 22 may define a lower level of image resolution (e.g., one-quarter resolution, one-eighth resolution, and so forth). In some examples, application 22 may progressively define image portions with less and less image resolution. For example, for image portions immediately neighboring image portions having full resolution, application 22 may define a one-half resolution, for image portions next to the immediately neighboring image portions, application 22 may define a one-quarter resolution, and so forth.

There may be other ways in which to define the image resolution such as a bands of resolutions. Also, application 22 need not be the only way in which image resolution is defined. In addition to or instead of application 22, some other component (e.g., GPU driver 32 or controller 36) may define the image resolution.

Input assembler circuit 44 may read vertex points of vertices from system memory 10 as defined by CPU 6, and assemble the control points to form the vertices. For instance, input assembler circuit 44 may read the coordinates, color values, and other such information. The coordinates, color values, and other such information may be commonly referred to as attributes of the vertices. Based on the attributes of the vertices, input assembler circuit 44 may determine the general layout of the primitives. Input assembler circuit 44 may be a fixed-function unit.

Vertex shader 50 may receive the attribute data for the attributes of vertices. Vertex shader 50 may perform per-vertex operations such as transformations, skinning, morphing, and per-vertex lighting. For example, application 22 may define the coordinates for the vertices of the primitives that form different objects in so-called "local coordinates." The local coordinates are three-dimensional coordinates (x, y, z), and define the coordinates in local space (e.g., relative to the object itself where the center of the object is at coordinate (0, 0, 0) as an example). Vertex shader 50 converts the local coordinates to world space via a model matrix, where the world space includes all of the objects in space that is encompassed by the image surface. The model matrix, sometimes referred to as a transformation matrix, translates, scales, and/or rotates the object to place where the object belongs in the larger world space. The model matrix may be defined by the developer of application 22.

Vertex shader 50 may multiply the world coordinates of the vertices with a view matrix that rotates the scene so that the objects are oriented to the viewer's point of view. Based on the viewer's point of view, some objects may appear in front of others in one point of view, and reverse in the other point of view, and the view matrix orients the objects correctly based on the viewer's point of view. As an example, a first object appears to be in front of a second object if the viewer is viewing the objects from a first point of view, but from the opposite point of view, the second object would appear in front of the first object. The view matrix may be defined by the developer of application 22.

Vertex shader 50 may clip the view space coordinates to a clip-space via a projection matrix. The projection matrix specifies a range of coordinates that the vertex shader transforms to a range of normalized device coordinates (NDCs) (e.g., −1.0 to 1.0). Vertex shader 50 clips all coordinates outside this range because those primitives are not visible. If only a part of a primitive is within the range, vertex shader 50 may clip the portion of the primitive outside the range, and generate primitives that fit inside the range.

Mathematically, vertex shader 50 may perform the following operation to generate the clip coordinates:

$$V\text{clip} = m_{projection} * M_{view} * M_{model} * V_{local},$$

where $m_{projection}$, $M_{view}$, and $M_{model}$ refer to the projection, view, and model matrices respectively, and $V_{local}$ refers to the local coordinates.

Binning circuit 52 receives the output from vertex shader 50 (e.g., vertices in clip coordinates) and determines to which tile (e.g., bin) a vertex belongs. For instance, the output of vertex shader 50 may be an x and y coordinate pair in viewer perspective, and a depth value (e.g., the z coordinate). Binning circuit 52 may utilize the x and y coordinates to determine to which tile that vertex belongs, as well as generate any additional graphics data needed for rendering by rendering pass circuitry 58. Binning circuit 52 may be a fixed function unit of one or more fixed-function units 40.

As an example, binning circuit 52 may determine to which tile each vertex belongs for a full pixel resolution image surface. GPU driver 32 may define a viewport, where the size of the viewport is the size of display 18 (e.g., 1920 pixels by 1080 pixels). GPU driver 32 may be preprogrammed with the size of display 18 during manufacture, or operating system 34 may provide the size of display 18 to GPU driver 32. GPU driver 32 may also provide information indicating the number of tiles, or the number of tiles may be preset and stored in local memory 14 or registers of GPU 12. In either case, binning circuit 52 may receive the size of the viewport and the number of tiles, and determine which pixels in the viewport belong to which tiles. In some examples, binning circuit 52 may receive information indicating the size of each tile and the number of tiles. In such examples, binning circuit 52 need not necessarily receive the viewport.

Vertex shader 50 may provide the x- and y-coordinates for the pixels from the viewer's perspective normalized to range between −1.0 to 1.0. Binning circuit 52 may utilize x and y-coordinates and the size and number of tiles to determine to which tile each of the vertices belongs. As an example, assume that there are 10×10 tiles, each with size of 10×10 pixels. In this example, if a vertex has NDC x and y coordinates of 0.6 and −0.4 respectively, binning circuit 52 may determine that the location of this vertex is at (80, 20) because each 0.1 step in the NDC is 5 pixels in this example. Because each tile is 10 pixels by 10 pixels, a vertex having x and y coordinates of 80 and 20 respectively would be in the eighth tile from the left, and second tile from the top. Binning circuit 52 may repeat such operations to identify to which tiles each of the vertices belong.

As described above, one example way in which binning circuit 52 may identify to which tile a vertex belongs is based on a digital value where each bit in the digital value corresponds to a tile. For vertices that belong to a particular tile, binning circuit 52 may set the bit corresponding to that tile to a digital one in the digital values for the vertices, and keep all others at a digital zero. There may be other ways to identify to which tile a vertex belongs.

Depth test circuit 54 may compare the z-coordinates of vertices processed by vertex shader 50 to determine whether a vertex is visible or not visible. Depth test circuit 54 may output the processed attributes of the vertices that are visible to streamout buffer 56. For example, if one vertex is in front of another vertex, then depth test circuit 54 may determine that the behind vertex is not visible and may not output any of the attribute data for the vertex to streamout buffer 56. In this way, binning pass circuitry 48 may generate a visibility stream of information that includes information indicating to which tile each vertex belongs.

The order of operations of binning pass circuitry 48 need not necessarily be set. For example, depth test circuit 54 may first determine whether vertex is occluded or not prior to binning circuit 52 determining to which tile the vertex belongs. Also, as described above, in some examples, application 22 may have defined the image resolution for the vertices. Accordingly, for the vertices that are visible whose attribute data is stored in streamout buffer 56, streamout buffer 56 may store the image resolution information for these vertices as well.

For examples, where application 22 defined the image resolutions in bands, binning circuit 52 may optionally determine to which resolution band a vertex belongs by comparing the x- and y-coordinates of the vertices and the resolution bands. Binning circuit 52 may store as attribute data in the streamout buffer 56 the image resolution information for the vertices. However, binning circuit 52 determining to which resolution band a vertex belongs is not necessary, and another component may determine to which resolution band a vertex belongs.

Rasterizer circuit 60 receives the attribute data for vertices of primitives from streamout buffer 56 and converts the primitives into pixels for display. For example, the primitives may be defined as vectors that indicate the interconnection of the primitives, and may be defined in a coordinate space that is independent of display 18 on which the image is to be displayed. Rasterizer circuit 60 converts these vectors into the display coordinates, and performs any additional functions such as removing points within primitives that are occluded. Rasterizer circuit 60 may be a fixed-function unit of one or more fixed-function units 40 and outputs values to pixel buffer 62.

In examples described in this disclosure, in converting vectors into the display coordinates, rasterizer circuit 60 may account for the image resolutions. As an example, application 22 may output a viewport command that defines the area within which rasterizer circuit 60 is to determine the display coordinates. In examples where the image resolution is not accounted for, the viewport command may define the size within which rasterizer circuit 60 is to determine the display coordinates to be the size of a tile (e.g., N×N). For example, for the first tile, the viewport command would define the size as (0, 0, N, N) (e.g., start from 0, 0 and end at N, N), for the second tile, the viewport command would define the size as (N, 0, N+N, N), and so forth.

However, in the examples described in this disclosure, rather than defining the size of the viewport to be the size of the tile, the size of the viewport may be smaller than the size of the tile and based on the image resolution. For example, GPU driver 32 may modify the viewport command defined by application 22.

For all the vertices that belong to the first tile, which is information available in streamout buffer 56 as the above described digital value, GPU driver 32 may determine to which resolution bands the vertices belong and whether there is a plurality or majority of image resolutions. As an example, assume there are five vertices in the first tile. For each vertex, GPU driver 32 may determine the image resolution defined by application 22. GPU driver 32 may determine if there is a particular image resolution that is a majority or the most likely image resolution. Based on the majority or most likely image resolution, GPU driver 32 may determine the image resolution for the first tile. In some examples, rather than using a majority or most likely image resolution, GPU driver 32 may determine an average or weighted average of the image resolutions to determine the image resolution for the first tile.

Also, in examples where attribute data defines the image resolutions for the vertices, GPU driver 32 may read the attribute data to determine the image resolution for the tile. For instance, similar to above, GPU driver 32 may determine if there is a majority or most likely image resolution and assign that image resolution for the entire tile, or some average or weighted average as the image resolution for the first tile.

GPU driver 32 may define the viewport (e.g., by modifying the viewport as defined by application 22) based on the determined image resolution and the size of the first tile. For example, if the determined resolution is one-quarter resolution, then GPU driver 32 may determine the size of the viewport as N/2×N/2. In this example, GPU driver 32 determined a ratio between the resolution of the image content in the first tile and the full resolution (e.g., quarter resolution) and multiplied the ratio with the size of the first tile to determine a size of the viewport (e.g., quarter multiplied by N×N is N/2×N/2).

In the above example, GPU driver 32 determined a resolution for the image content of the first tile. However, the image resolution for some of the vertices that are in the first tile may be different than the image resolution determined by GPU driver 32. For example, if vertices of a primitive in the first tile is defined to an image resolution of a quarter (e.g., based on the resolution band to which the primitive belonged), but based on the majority image resolution, GPU driver 32 may determine that the image resolution for the first tile is full resolution. In this case, although defined for quarter resolution, the final rendered resolution for the pixels in the primitive may be full resolution. If, based on the majority resolution, GPU driver 32 determined that the image resolution for the first tile is eighth resolution, then although defined for quarter resolution, the final rendered resolution for the primitive may be eighth resolution.

Although the above example is described with respect to GPU driver 32, controller 36 may perform similar operations or GPU driver 32 and controller 36 may together perform these operations. For instance, controller 36 may define the viewport based on the determined image resolution for the tile and modify the viewport command.

Accordingly, GPU driver 32 or controller 36 may determine that a first tile of an image surface is to include image content having a first resolution (e.g., first image resolution). The first resolution is less than a second resolution for other tiles of the image surface. For example, the first resolution may be an eighth resolution, and image content in other tiles may be at full resolution or quarter resolution. GPU driver 32 or controller 36 may define a viewport for the first tile based on the first resolution of the image content in the first tile and the size of the first tile.

Pixel shader 64 receives the pixels from pixel buffer 62 as outputted by rasterizer circuit 60 and performs post processing to assign color values to each of the pixels that are to be displayed. For example, pixel shader 64 may receive constant values stored in system memory 10, texture data stored in system memory 10, and any other data to generate per-pixel outputs such as color values. Pixel shader 64 may also output opacity values that indicate the opaqueness of the pixels. Pixel shader 64 may output the resulting pixel values to local memory 14. In this way, rendering pass circuitry 58 may render the image content for the first tile at a size that is smaller than a size of the first tile and based on the first resolution of the image content in the first tile. For instance, rasterizer circuit 60 may determine display coordinates based on the size of viewport as defined by GPU driver 32 and/or controller 36, and pixel shader 64 may determine per-pixel values for each of the pixels in the viewport.

Although not illustrated, in some examples, pixel shader 64 may output to an output merge circuit for any final pixel processing. For example, the output merge circuit may utilize depth information to further determine whether any of the pixels should be removed from being displayed. The output merge circuit may also perform blending operations to generate final pixel values. In such examples, the output merge circuit may output the final pixel values to local memory 14.

Rendering pass circuitry 58 may repeat these operations for each tile, and generate image content for each tile. In some examples, only a single rendering pass may be needed, where a rendering pass refers to the rendering of image content in all of the tiles. For example, application 22 may need to issue only one render command to have GPU 12 render the image content for each of the tiles at different image resolutions, rather than issuing multiple rendering commands to have GPU 12 render the image content at different image resolutions.

Upsample circuit 42 may retrieve the image content stored in local memory 14, and upsample the image content based on the determined image resolution. For example, GPU driver 32 or controller 36 may indicate to upsample circuit 42 the image resolution for each of the tiles. Upsample circuit 42 may utilize the image resolution information to determine by how much to upsample the image content. For instance, if the image resolution for a first tile is quarter, then upsample circuit 42 may upsample the image content by a factor of four. If the image resolution for a second tile is full resolution, then upsample circuit 42 may function as a pass through with no upsampling.

There are various ways in which upsample circuit 42 may upsample the image content, and the techniques are not limited to any specific way in which to upsample. As one example, upsample circuit 42 may copy the same pixel value multiple times (e.g., four times to upsample by a factor of four). As another example, upsample circuit 42 may interpolate pixel values across a plurality of pixels to generate pixel values for additional pixels.

In some examples, upsample circuit 42 may upsample the image content as part of outputting the pixel values for the image content to frame buffer 66. For instance, during the outputting of the image content, upsample circuit 42 may upsample pixel values to generate more pixel values for pixels as part of writing the pixel values for that pixel. In some examples, upsample circuit 42 may first upsample all of the image content in the first tile and store the upsampled image content into local memory 14. Upsample circuit 42, or possibly some other component, may output the upsampled image content to frame buffer 66.

Figure 4:
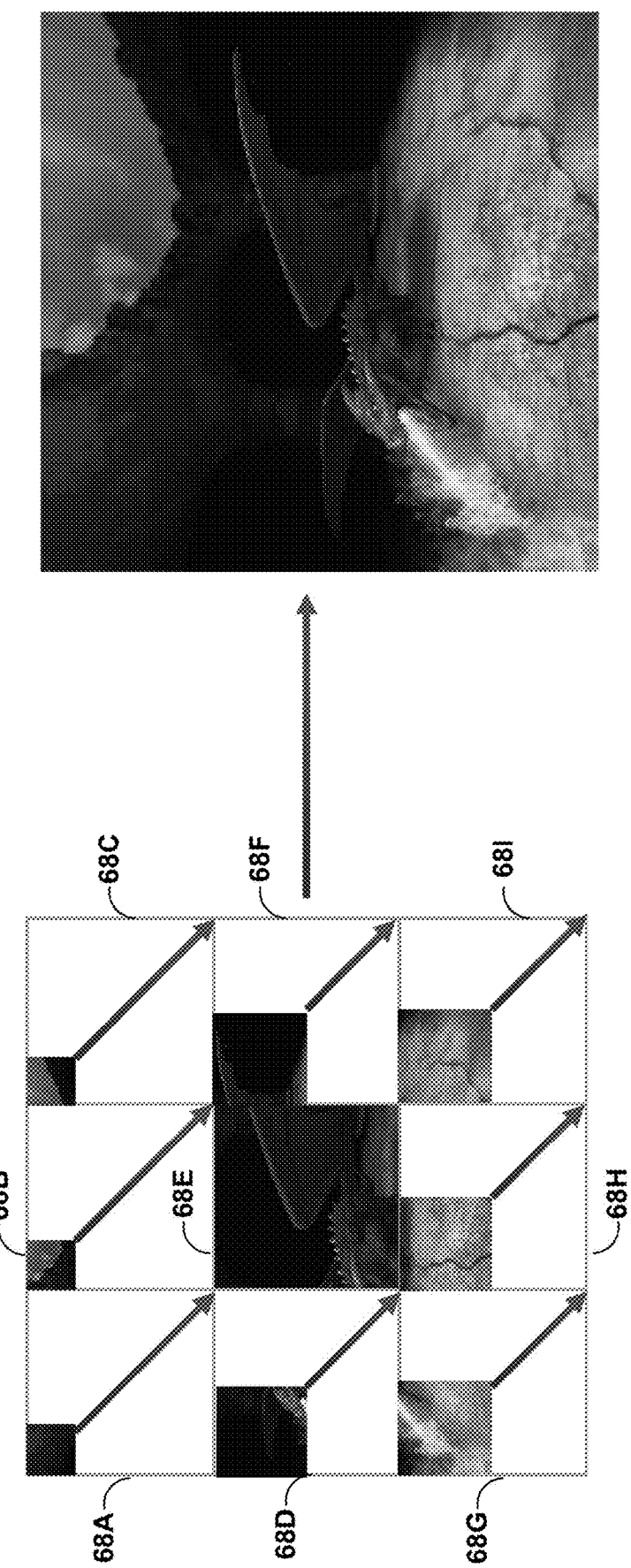
FIG. 4 is a pictorial diagram illustrating one example of foveation rendering.

FIG. 4 is a pictorial diagram illustrating one example of foveation rendering. In the example illustrated in FIG. 4, GPU driver 32 or controller 36 may divide the image surface into nine tiles 68A-68I, each of size N×N. During the rendering of tiles 68A-68C, GPU driver 32 or controller 36 may have determined that the image resolution for the image content in tiles 68A-68C is at a one-sixteenth resolution. Accordingly, rendering pass circuitry 58 may render the image content of tiles 68A-68C to a viewport of size N/4×N/4, as illustrated in FIG. 4. For example, the image content of tiles 68A-68C is one-sixteenth of the size of tiles 68A-68C.

During the rendering of tiles 68D, 68F, and 68G-68I, GPU driver 32 or controller 36 may have determined that the image resolution for the image content in tiles 68D, 68F, and 68G-68I is at a quarter resolution. Accordingly, rendering pass circuitry 58 may render the image content of tiles 68D, 68F, and 68G-68I to a viewport of size N/2×N/2, as illustrated in FIG. 4. For example, the image content of tiles 68D, 68F, and 68G-68I is a fourth of the size of tiles 68D, 68F, and 68G-68I. During rendering of tile 68E, GPU driver 32 or controller 36 may have determined that the image resolution for the image content in tile 68E is at full resolution. Accordingly, rendering pass circuitry 58 may render the image content of tile 68E to a viewport of size N×N, as illustrated in FIG. 4. For example, the image content of tile 68E is equal to the size of tile 68E.

Rendering pass circuitry 58 may store the image content for tiles 68A-68I in local memory 14. Upsample circuit 42 may retrieve the image content and respectively upsample image content of the tiles. For example, for the image content in tiles 68A-68C, upsample circuit 42 may upsample the image content by a factor of 16. For the image content in tiles 68D, 68F, and 68G-68I, upsample circuit 42 may upsample the image content by a factor of four. For the image content in tile 68E, upsample circuit 42 may not upsample the image content.

The right side of FIG. 4 illustrates the final image that is stored in frame buffer 66. In this example, the image surface appears relatively clear with higher resolution in the center of the image surface, where the viewer should be focused. For the other portions of the image surface, where the viewer need not necessarily focus or where there is not much difference in image content, GPU 12 had to execute fewer instances of pixel shader 64, and generally had fewer pixels to process which results in faster rendering with less power usage.

Figure 5:
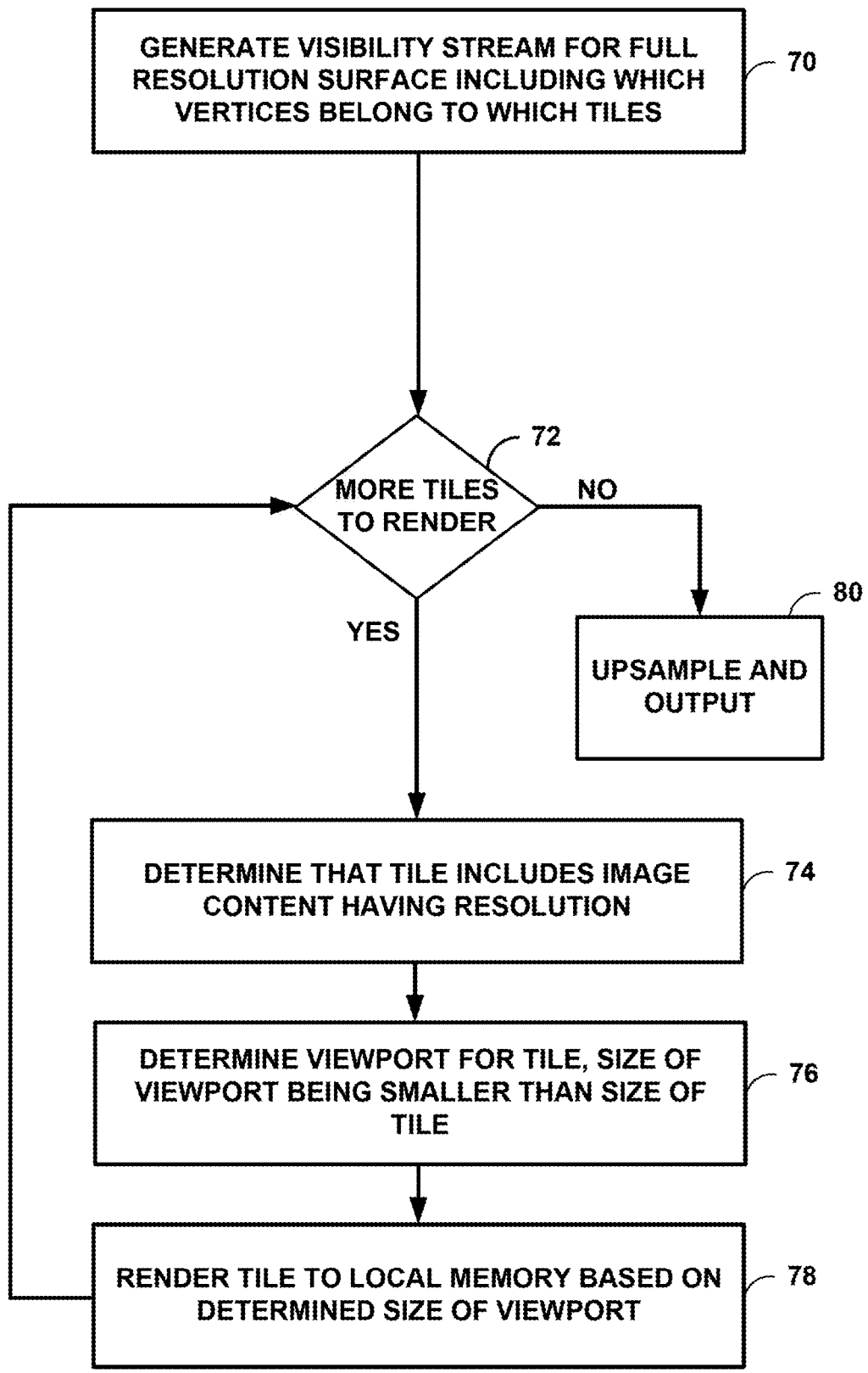
FIG. 5 is a flowchart illustrating an example method of foveation rendering.

FIG. 5 is a flowchart illustrating an example method of foveation rendering. In the example illustrated in FIG. 5, during a binning pass, and prior to the rendering pass, binning pass circuitry 48 may generate a visibility stream for full resolution surface including information indicating which vertices belong to which tiles (70). For example, as described above, vertex shader 50 may generate clip coordinates for the vertices that binning circuit 52 receives. GPU driver 32 or controller 36 determine the number and size of tiles for the image surface. Binning circuit 52 receives the clip coordinates and based on the x and y coordinates and the number and size of the tiles determines to which tiles vertices for the primitives belong. In addition, depth test circuit 54 may determine whether a vertex or primitive is visible and output vertices that are visible to streamout buffer 56.

GPU driver 32 or controller 36 may determine whether there are more tiles to render (72). If there are more tiles to render (YES of 72), GPU driver 32 or controller 36 may determine that resolution of a first tile of image surface is a first resolution (74). In this example, the first resolution of the first tile may be less than the image resolution in other tiles. As an example, the first tile may be tile 68A. In this example, the image resolution for tile 68A is one-sixteenth, and the image resolution for tile 68D is one-quarter.

To determine the image resolution for the first tile, GPU driver 32 or controller 36 may determine resolutions for different portions of the image surface. For example, application 22 may define resolution bands, and GPU driver 32 or controller 36 may determine resolution for the different portions of the image surface based on the resolution bands that application 22 defined (e.g., by comparing the x and y coordinates for tiles in the image surface with the coordinates for the resolution bands and determine which resolutions there are for the different portions of the image surface).

For the vertices that belong in the first tile, GPU driver 32 or controller 36 may determine the image resolutions for these vertices based on the location of the vertices in the resolution bands defined by application 22. GPU driver 32 or controller 36 may determine the resolution for the first tile based on where a majority of where the first tile lies (e.g., first image resolution band or second image resolution band). GPU driver 32 or controller 36 may determine the resolution of the first tile based on the resolution band within which the first tile lies.

Rendering pass circuitry 58 may render the image content for the first tile at a size that is smaller than a size of the first tile and based on the first resolution of the image content in the first tile. For example, GPU driver 32 or controller 36 may determine a viewport for the tile, where the size of the viewport is smaller than a size of the tile (76). To determine the size of the viewport, GPU driver 32 or controller 36 may define the viewport for the first tile based on the first resolution of the image content in the first tile and the size of the first tile. For example, GPU driver 32 or controller 36 may multiply a ratio between the first resolution of the image content in the first tile and a full resolution with the size of the first tile to determine a size of the viewport.

Rendering pass circuitry 58 may render image content of the first tile to local memory 14 based on the determined size of the viewport (78). For example, rendering pass circuitry 58 may generate image content for the first tile, but the size of the image content may be the size of the viewport and not the size of the tile. Local memory 14 may store the image content for the first tile.

GPU driver 32 or controller 36 may determine whether there are more tiles to render (72). If there are more tiles to render (YES of 72), then GPU 12 may repeat these operations but for a different tile. For example, GPU driver 32 or controller 36 may determine that a second tile of the image surface is to include image content having a second resolution, and rendering pass circuitry 58 may render the image content for the second tile at a size that is smaller than the size of the second tile and based on the second resolution of the image content in the second tile.

If, however, there are no more tiles to render (NO of 72), upsample circuit 42 may upsample and output the image content to frame buffer 66 (80). Upsample circuit 42 may upsample based on the image resolutions (e.g., if one-quarter resolution for the image content for a tile, then upsample the image content by four). In some examples, upsample circuit 42 may upsample as part of outputting. In some examples, upsample circuit 42 may first upsample all of the image content of the tile, store the image content, and then output the image content to frame buffer 66.

The following is pseudo-code indicating how graphics driver 32 or controller 36 may determine the image resolution for a tile:

```
float bin_scale (float fx, float fy, float gx, float gy,
float w, float box_x, float box_y,
float box_w, float box_h) {
    float xf1 = (box_x-fx)*gx;
    float xf2 = (box_x_box_w-fx)*gx;
    float yf1 = (box_y-fy)*gy;
    float yf2 = (box_y+box_h-fy)*gy;
    float xf3 = 0;
    float yf3 = 0;
    if (sign(xf1) == sign (xf2)) xf3 = mag_min(xf1, xf2);
    if (sign(yf1) == sign (yf2)) yf3 = mag_min(yf1, yf2);
    float pix_area = max(1, xf3*xf3+yf3*yf3+w);
    return 1./sqrt(pix_area);
}
```

The above example techniques may provide various advantages for foveation rendering. In some other techniques, an application (like application 22) may create separate framebuffers for each region that it wanted to render at different resolutions. The application may determine different projection matrices for each framebuffers, and generate command buffers for each of these frame buffers. The application may instruct GPU driver 32 to blit (e.g., combine into one) the different frame buffers into a single framebuffer. GPU 12 may then perform binning of each of the framebuffers and render all of the primitives for the tiles of these framebuffers. GPU 12 may output each tile of the smaller framebuffers to memory 10, and then GPU 12 reads back the data from each smaller framebuffer (or display processor 16 reads back the data from each smaller framebuffer) from memory 10 and blits to their area on the larger framebuffer.

However, in the above techniques, application 22 may only need to generate commands once rather than for each framebuffer like was needed in the other techniques, which can save 3× workload for CPU 6. Also, GPU 12 may only need to perform binning once and not rely on different projection matrices, which can save 3× in terms of vertex and primitive processing workload compared to some other techniques where multiple different framebuffers are needed (e.g., multiple different images are rendered, read back from system memory 10, and then combined together). Also, in the above techniques, GPU 12 does not need to write out different images to system memory 10 and then read them back for combining, which can save power and memory bandwidth.

The above describes one example way in which to perform the foveated rendering. However, the techniques described in this disclosure are not so limited.

As another example foveation technique, CPU 6 and GPU 12 may use similar techniques like those described above to determine to which tiles which primitives belong (e.g., perform binning pass similar to above). After performing a binning pass, GPU 12 may store the image content of the entire surface to the smallest resolutions of the resolutions defined by the application 22. GPU 12 may upsample the entire image to an intermediate resolution (e.g., go from $1/16^{th}$ resolution to $1/4^{th}$ resolution). In this case the pixel resolution for the entire image surface is $1/4^{th}$ pixel resolution but the image resolution is $1/16^{th}$.

For the portions of the image surface that need to be rendered at $1/4^{th}$ image resolution, CPU 6 may define a scissor region, and GPU 12 may render just the portion within the scissor region with $1/4^{th}$ pixel resolution. GPU 12 may then upsample the resulting entire image surface.

In this case, there will be some portions having $1/16^{th}$ image resolution, and other portions having $1/4^{th}$ image resolution, but the entire image will be at full pixel resolution. CPU 6 may determine if there are any portions that are to be a full image resolution, and scissor those regions. GPU 12 may render image content of the scissor region at full pixel resolution. Therefore, at the end, there will some portions with $1/16^{th}$ image resolution, other portions with $1/4^{th}$ image resolution, and other portions with full image resolution. In this way, GPU 12 may provide another example way of foveation rendering.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Various aspects and examples have been described. However, modifications can be made to the structure or techniques of this disclosure without departing from the scope of the following claims.

What is claimed is:
1. A method of foveation rendering, the method comprising:
   during a binning pass, dividing an image surface into a plurality of tiles, wherein image content of the image surface is to be rendered during a rendering pass;

determining that a first tile of the plurality of tiles of the image surface is to include image content having a first resolution, wherein the first resolution is less than a second resolution for other tiles of the plurality of tiles of the image surface;

determining a size at which to render the image content for the first tile, wherein the size at which to render the image content for the first tile is based on the first resolution of the image content in the first tile, wherein the size at which to render the image content is smaller than a size of the first tile, and wherein the image content for the first tile is part of the image content of the image surface, which was divided during the binning pass, and the image content is to be rendered during the rendering pass;

during the rendering pass, rendering the image content for the first tile at the determined size that is smaller than the size of the first tile and based on the first resolution of the image content in the first tile, wherein the image content rendered for the entire first tile covers less than the entire first tile, wherein the image content rendered for the entire first tile does not overlap image content for any other tile, wherein rendering the image content comprises rendering the image content for the first tile to a portion of memory, wherein the portion of the memory is less than the entire memory for the first tile, and wherein the size of the rendered image content is less than the size of the entire first tile;

upsampling the image content in the first tile to generate upsampled image content;

interpolating the upsampled image content based on the upsampled image content in the first tile to generate interpolated image content; and outputting the interpolated image content.

2. The method of claim 1, further comprising:
defining a viewport for the first tile based on the first resolution of the image content in the first tile and the size of the first tile,
wherein rendering the image content for the first tile at the size that is smaller than the size of the first tile comprises rendering the image content based on the defined viewport for the first tile.

3. The method of claim 2, wherein defining the viewport comprises:
multiplying a ratio between the first resolution of the image content in the first tile and a full resolution of the image content by the size of the first tile to determine a size of the viewport.

4. The method of claim 1, further comprising:
determining resolutions for different portions of the image surface; and
during the binning pass, and prior to the rendering, determining which vertices of primitives of the image surface belong to the first tile,
wherein determining that the first tile of the image surface is to include image content having the first resolution comprises determining that the first tile of the image surface is to include image content having the first resolution based on the determination of resolutions for different portions of the image surface and the determination of which vertices of the image surface belong to the first tile.

5. The method of claim 4, further comprising:
receiving information indicative of the resolutions for portions of the image surface,
wherein determining resolutions for different portions of the image surface comprises determining resolutions for different portions of the image surface based on the received information.

6. The method of claim 1, wherein upsampling the image content comprises upsampling as part of the outputting of the upsampled image content.

7. The method of claim 1, wherein the upsampled image content comprises a first upsampled image content, the method further comprising:
determining that a second tile of the image surface is to include image content having the second resolution;
rendering the image content for the second tile at a size that is smaller than the size of the second tile and based on the second resolution of the image content in the second tile;
upsampling the image content in the second tile to generate a second upsampled image content; and
outputting the second upsampled image content.

8. The method of claim 7, wherein upsampling the image content in the first tile and outputting the first upsampled image content comprises upsampling the image content in the first tile and outputting the first upsampled image content after rendering the image content for the second tile.

9. The method of claim 1, further comprising displaying the upsampled image content.

10. A device for foveation rendering, the device comprising:
a system memory; and
a graphics processing unit (GPU) comprising at least one of programmable or fixed-function circuitry, wherein the GPU is configured to:
during a binning pass, divide an image surface into a plurality of tiles, wherein image content of the image surface is to be rendered during a rendering pass;
determine that a first tile of the plurality of tiles of the image surface is to include image content having a first resolution, wherein the first resolution is less than a second resolution for other tiles of the plurality of tiles of the image surface;
determine a size at which to render the image content for the first tile, wherein the size at which to render the image content for the first tile is based on the first resolution of the image content in the first tile, wherein the size at which to render the image content is smaller than a size of the first tile, and wherein the image content for the first tile is part of the image content of the image surface, which was divided during the binning pass, and the image content is to be rendered during the rendering pass;
during the rendering pass, render the image content for the first tile at the determined size that is smaller than the size of the first tile and based on the first resolution of the image content in the first tile, wherein the image content rendered for the entire first tile covers less than the entire first tile, wherein the image content rendered for the entire first tile does not overlap image content for any other tile, wherein to render the image content, the GPU is configured to render the image content for the first tile to a portion of memory for the GPU, wherein the portion of the memory for the GPU is less than the entire memory for the first tile in the system memory, and wherein the size of the rendered image content is less than the size of the entire first tile;
upsample the image content in the first tile to generate upsampled image content;

interpolate the upsampled image content based on the upsampled image content in the first tile to generate interpolated image content; and output the interpolated image content for storage in the system memory.

11. The device of claim 10, further comprising a processor configured to define a viewport for the first tile based on the first resolution of the image content in the first tile and the size of the first tile, wherein to render the image content for the first tile at the size that is smaller than the size of the first tile, the GPU is configured to render the image content based on the defined viewport for the first tile.

12. The device of claim 11, wherein to define the viewport, the processor is configured to multiply a ratio between the first resolution of the image content in the first tile and a full resolution of the image content by the size of the first tile to determine a size of the viewport.

13. The device of claim 10, further comprising a processor configured to determine resolutions for different portions of the image surface, wherein the GPU is configured to, during the binning pass, and prior to the rendering, determine which vertices of primitives of the image surface belong to the first tile, wherein to determine that the first tile of the image surface is to include image content having the first resolution, the GPU is configured to determine that the first tile of the image surface is to include image content having the first resolution based on the determination of resolutions for different portions of the image surface and the determination of which vertices of the image surface belong to the first tile.

14. The device of claim 13, wherein the GPU is configured to receive information indicative of the resolutions for portions of the image surface, wherein to determine resolutions for different portions of the image surface, the GPU is configured to determine resolutions for different portions of the image surface based on the received information.

15. The device of claim 10, wherein to upsample, the GPU is configured to upsample the image content as part of the outputting of the upsampled image content.

16. The device of claim 10, wherein the upsampled image content comprises a first upsampled image content, and wherein the GPU is configured to:

determine that a second tile of the image surface is to include image content having the second resolution;

render the image content for the second tile at a size that is smaller than the size of the second tile and based on the second resolution of the image content in the second tile;

upsample the image content in the second tile to generate a second upsampled image content; and output the second upsampled image content.

17. The device of claim 16, wherein to upsample the image content in the first tile and output the first upsampled image content, the GPU is configured to upsample the image content in the first tile and output the first upsampled image content after rendering the image content for the second tile.

18. The device of claim 10, further comprising a display processor configured to output the upsampled image content to a display.

19. A device for foveation rendering, the device comprising:

means for dividing an image surface into a plurality of tiles during a binning pass, wherein image content of the image surface is to be rendered during a rendering pass;

means for determining that a first tile of the plurality of tiles of the image surface is to include image content having a first resolution, wherein the first resolution is less than a second resolution for other tiles of the plurality of tiles of the image surface;

means for determining a size at which to render the image content for the first tile, wherein the size at which to render the image content for the first tile is based on the first resolution of the image content in the first tile, wherein the size at which to render the image content is smaller than a size of the first tile, and wherein the image content for the first tile is part of the image content of the image surface, which was divided during the binning pass, and the image content is to be rendered during the rendering pass;

means for rendering the image content for the first tile at the determined size that is smaller than the size of the first tile and based on the first resolution of the image content in the first tile during the rendering pass, wherein the image content rendered for the entire first tile covers less than the entire first tile, wherein the image content rendered for the entire first tile does not overlap image content for any other tile, wherein the means for rendering the image content comprises means for rendering the image content for the first tile to a portion of memory, wherein the portion of the memory is less than the entire memory for the first tile, and wherein the size of the rendered image content is less than the size of the entire first tile;

means for upsampling the image content in the first tile to generate upsampled image content;

means for interpolating the upsampled image content based on the upsampled image content in the first tile to generate interpolated image content and means for outputting the interpolated image content.

20. The device of claim 19, further comprising:

means for defining a viewport for the first tile based on the first resolution of the image content in the first tile and the size of the first tile, wherein the means for rendering the image content for the first tile at the size that is smaller than the size of the first tile comprises means for rendering the image content based on the defined viewport for the first tile.

21. The device of claim 19, further comprising:

means for determining resolutions for different portions of the image surface; and means for, during the binning pass, and prior to the rendering, determining which vertices of primitives of the image surface belong to first tile, wherein the means for determining that the first tile of the image surface is to include image content having the first resolution comprises means for determining that the first tile of the image surface is to include image content having the first resolution based on the determination of resolutions for different portions of the image surface and the determination of which vertices of the image surface belong to the first tile.

22. The device of claim 19, wherein the means for outputting comprises the means for upsampling.

23. A non-transitory computer-readable storage medium storing instructions thereon that when executed cause one or more processors of a device for foveation rendering to:
- during a binning pass, divide an image surface into a plurality of tiles, wherein image content of the image surface is to be rendered during a rendering pass;
- determine that a first tile of the plurality of tiles of the image surface is to include image content having a first resolution, wherein the first resolution is less than a second resolution for other tiles of the plurality of tiles of the image surface;
- determine a size at which to render the image content for the first tile, wherein the size at which to render the image content for the first tile is based on the first resolution of the image content in the first tile, wherein the size at which to render the image content is smaller than a size of the first tile, and wherein the image content for the first tile is part of the image content of the image surface, which was divided during the binning pass, and the image content is to be rendered during the rendering pass;
- during the rendering pass, render the image content for the first tile at the determined size that is smaller than the size of the first tile and based on the first resolution of the image content in the first tile, wherein the image content rendered for the entire first tile covers less than the entire first tile, wherein the image content rendered for the entire first tile does not overlap image content for any other tile, wherein the instructions that cause the one or more processors to render the image content comprise instructions that cause the one or more processors to render the image content for the first tile to a portion of memory, wherein the portion of the memory is less than the entire memory for the first tile, and wherein the size of the rendered image content is less than the size of the entire first tile;
- upsample the image content in the first tile to generate upsampled image content; and
- output the upsampled image content.

24. The non-transitory computer-readable storage medium of claim 23, further comprising instructions that cause the one or more processors to:
- define a viewport for the first tile based on the first resolution of the image content in the first tile and the size of the first tile,
- wherein the instructions that cause the one or more processors to render the image content for the first tile at the size that is smaller than the size of the first tile comprise instructions that cause the one or more processors to render the image content based on the defined viewport for the first tile.

* * * * *